United States Patent
Kato et al.

(10) Patent No.: US 9,945,453 B2
(45) Date of Patent: Apr. 17, 2018

(54) MULTIPLE SPEED TRANSMISSION

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Takayoshi Kato, Handa (JP); Takashi Morimoto, Gamagori (JP); Toshihiko Aoki, Anjo (JP); Hiroshi Kato, Kariya (JP); Satoru Kasuya, Nishio (JP); Tomochika Inagaki, Anjo (JP); Minoru Todo, Takahama (JP); Shinji Oita, Toyota (JP); Masaru Morise, Nukata (JP); Terufumi Miyazaki, Toyota (JP); Yoshio Hasegawa, Chiryu (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 215 days.

(21) Appl. No.: 14/896,752

(22) PCT Filed: Mar. 27, 2014

(86) PCT No.: PCT/JP2014/058941
§ 371 (c)(1),
(2) Date: Dec. 8, 2015

(87) PCT Pub. No.: WO2015/029481
PCT Pub. Date: Mar. 5, 2015

(65) Prior Publication Data
US 2016/0138683 A1    May 19, 2016

(30) Foreign Application Priority Data

Aug. 30, 2013  (JP) ................................. 2013-180364
Nov. 29, 2013  (JP) ................................. 2013-248580

(51) Int. Cl.
*F16H 3/66* (2006.01)

(52) U.S. Cl.
CPC ............... *F16H 3/663* (2013.01); *F16H 3/66* (2013.01); *F16H 2200/0069* (2013.01);
(Continued)

(58) Field of Classification Search
CPC ..... F16H 2200/2023; F16H 2200/2046; F16H 2200/2012
See application file for complete search history.

(56) References Cited

U.S. PATENT DOCUMENTS

| | | |
|---|---|---|
| 5,029,685 A | 7/1991 | Takase et al. |
| 7,566,283 B2 * | 7/2009 | Gumpoltsberger ....... F16H 3/66 475/275 |

(Continued)

FOREIGN PATENT DOCUMENTS

| | | |
|---|---|---|
| DE | 10 2013 021 000 A1 | 6/2015 |
| JP | 2004-052806 A | 2/2004 |

(Continued)

OTHER PUBLICATIONS

Sep. 2, 2016 Search Report issued in European Patent Application No. 14839632.8.

(Continued)

*Primary Examiner* — Stacey Fluhart
(74) *Attorney, Agent, or Firm* — Oliff PLC

(57) ABSTRACT

An automatic transmission 20 includes: a Simpson type complex planetary gear train 25 including single pinion type first and second planetary gears 21 and 22 and single pinion type third and fourth planetary gears 23 and 24; first through fourth clutches C1 to C4; and first and second brakes B1 and B2. A first carrier 21c of the first planetary gear 21 is coupled (Continued)

to an input shaft 20*i*. A first ring gear 21*r* of the first planetary gear 21 is selectively connected to an output shaft 20*o* by the first clutch C1.

24 Claims, 10 Drawing Sheets

(52) U.S. Cl.
CPC ............... *F16H 2200/201* (2013.01); *F16H 2200/2012* (2013.01); *F16H 2200/2023* (2013.01); *F16H 2200/2046* (2013.01)

(56) References Cited

U.S. PATENT DOCUMENTS

| | | | | |
|---|---|---|---|---|
| 7,566,582 | B2* | 7/2009 | Tapalian | B81B 3/0021 |
| | | | | 257/415 |
| 7,632,206 | B2* | 12/2009 | Gumpoltsberger | F16H 3/66 |
| | | | | 475/275 |
| 7,651,431 | B2* | 1/2010 | Phillips | F16H 3/66 |
| | | | | 475/282 |
| 8,096,915 | B2 | 1/2012 | Wittkopp et al. | |
| 8,202,190 | B2 | 6/2012 | Phillips et al. | |
| 8,231,496 | B2 | 7/2012 | Gumpoltsberger et al. | |
| 8,303,455 | B2* | 11/2012 | Gumpoltsberger | F16H 3/66 |
| | | | | 475/280 |
| 8,425,370 | B2 | 4/2013 | Leesch et al. | |
| 2004/0014552 | A1 | 1/2004 | Ikeda | |
| 2009/0054196 | A1 | 2/2009 | Phillips et al. | |
| 2010/0048344 | A1* | 2/2010 | Kamm | F16H 3/66 |
| | | | | 475/275 |
| 2010/0210397 | A1* | 8/2010 | Wittkopp | F16H 3/66 |
| | | | | 475/275 |
| 2011/0045936 | A1* | 2/2011 | Gumpoltsberger | F16H 3/66 |
| | | | | 475/271 |
| 2011/0045939 | A1* | 2/2011 | Gumpoltsberger | F16H 3/66 |
| | | | | 475/275 |
| 2011/0251014 | A1* | 10/2011 | Leesch | F16H 3/66 |
| | | | | 475/296 |
| 2013/0150204 | A1 | 6/2013 | Park et al. | |
| 2015/0267787 | A1 | 9/2015 | Hart | |

FOREIGN PATENT DOCUMENTS

| | | |
|---|---|---|
| JP | 2004-232718 A | 8/2004 |
| JP | 2005-106149 A | 4/2005 |
| JP | 2009-051264 A | 3/2009 |
| JP | 2012-507667 A | 3/2012 |
| KR | 2013-0064322 A | 6/2013 |
| WO | 2013/088900 A1 | 6/2013 |
| WO | 2015/086101 A1 | 6/2015 |

OTHER PUBLICATIONS

Jul. 1, 2014 International Search Report issued in International Patent Application No. PCT/JP2014/058941.

Belz, "Varianten von Mehrgang-Planetengetrieben," Mar. 8, 2016, XP055257458, Retrieved from the Internet: URL: https://register.epo.org/application?documentID=EYPWMGE67270DSU&appnumber=EP13756488&showPdfPage=all.

Jun. 7, 2016 Partial Supplementary Search Report issued in European Patent Application No. 14839632.8.

* cited by examiner

FIG. 3

| | C1 | C2 | C3 | C4 | B1 | B2 | GEAR RATIO | STEP RATIO |
|---|---|---|---|---|---|---|---|---|
| 1st | - | - | O | O | O | - | 4.597 | 1.453 |
| 2nd | - | - | - | O | O | O | 3.164 | 1.360 |
| 3rd | - | - | O | - | O | O | 2.326 | 1.225 |
| 4th | O | - | - | - | O | O | 1.899 | 1.281 |
| 5th | O | - | O | - | - | O | 1.482 | 1.258 |
| 6th | O | - | - | O | - | O | 1.178 | 1.178 |
| 7th | O | O | - | O | - | - | 1.000 | 1.214 |
| 8th | O | O | - | - | - | O | 0.823 | 1.196 |
| 9th | - | O | - | O | - | O | 0.688 | 1.078 |
| 10th | - | O | O | - | - | O | 0.638 | |
| REV. | - | O | O | - | O | - | -3.981 | 0.866 |
| | ※ "O": ENGAGEMENT, "-": DISENGAGEMENT | | | | | | SPREAD | 7.203 |

MULTIPLE SPEED TRANSMISSION

TECHNICAL FIELD

Preferred embodiments relate to a multiple speed transmission that changes a speed of power transmitted to an input member and transmits the power to an output member.

BACKGROUND ART

A multiple speed transmission of this type in the related art includes two single pinion type planetary gears, a so-called Simpson type complex planetary gear train, four clutches, and two brakes, and provides first to tenth forward speeds and a reverse speed (see, for example, Patent Document 1). In this multiple speed transmission, an input element (a carrier disposed in the two planetary gears) of a complex planetary gear train is constantly coupled to an input shaft to which power from a motor is transmitted, and a carrier of one of the planetary gears disposed separate from the complex planetary gear train is selectively coupled to the input shaft by the clutch. In this multiple speed transmission, a ring gear of the one planetary gear and a carrier of the other planetary gear disposed close to the complex planetary gear train are coupled to an output member.

RELATED-ART DOCUMENTS

Patent Documents

[Patent Document 1] U.S. Pat. No. 8,202,190 (FIG. 2 and FIG. 3)

SUMMARY

A multiple speed transmission that can provide first to tenth forward speeds in a manner similar to the multiple speed transmission in the related art described above is supposed to enhance both power transmission efficiency (fuel efficiency and acceleration performance of a vehicle) and drivability. However, in this multiple speed transmission in the related art, large torque is distributed to the clutch selectively coupling the carrier of the one planetary gear separate from the complex planetary gear train to the input shaft disadvantageously. For this reason, in the multiple speed transmission, it is difficult to reduce the size of the clutch in both an axial direction and a radial direction, leading to an increased size of the entire apparatus.

In view of this, a main object of a preferred embodiment is to provide a multiple speed transmission that allows an increase in size to be suppressed with enhancement of both power transmission efficiency and drivability.

In a multiple speed transmission according to invention preferred embodiment, a multiple speed transmission for changing a speed of power transmitted to an input member and transmitting the power to an output member, the multiple speed transmission including:

a first planetary gear including a first rotation element, a second rotation element, and a third rotation element that are arranged in order with intervals in accordance with a gear ratio on a velocity diagram;

a second planetary gear including a fourth rotation element, a fifth rotation element, and a sixth rotation element that are arranged in order with intervals in accordance with a gear ratio on a velocity diagram;

a complex planetary gear train including a fixable element, an input element constantly coupled to the input member, a first output element, and a second output element that are arranged in order with intervals in accordance with a gear ratio on a velocity diagram; and six engaging elements each connecting and disconnecting a rotation element of one of the first planetary gear, the second planetary gear, and the complex planetary gear train to and from another rotation element or a stationary member, in which the first rotation element of the first planetary gear is constantly coupled to the fourth rotation element of the second planetary gear, the second rotation element of the first planetary gear is constantly coupled to the input element of the complex planetary gear train, the fifth rotation element of the second planetary gear is constantly coupled to the output member, a first engaging element of the six engaging elements connects and disconnects the fifth rotation element of the second planetary gear and the output member that are constantly coupled to each other to and from the third rotation element of the first planetary gear, and first through tenth forward speeds and a reverse speed are formed by selectively engaging three of the six engaging elements including the first engaging element.

The multiple speed transmission includes the first and second planetary gears, the complex planetary gear train, and the six engaging elements including the first engaging element. In the multiple speed transmission, the first through tenth forward speeds and the reverse speed can be formed by selectively engaging three of the six engaging elements. As a result, the multiple speed transmission can enhance power transmission efficiency, that is, fuel efficiency and acceleration performance of a vehicle, by increasing a spread (gear ratio width=gear ratio of lowest shift speed/gear ratio of highest shift speed), and also enhance shifting feeling by optimizing (suppressing an increase in) a step ratio (gear ratio in one shift speed/gear ratio of next higher shift speed). Thus, the multiple speed transmission can favorably enhance both power transmission efficiency and drivability.

In addition, in the multiple speed transmission, in a manner similar to the input element of the complex planetary gear train, the second rotation element of the first planetary gear is constantly coupled to the input member, and the third rotation element of the first planetary gear is selectively connected to the output member (and the fifth rotation element of the second planetary gear) by the first clutch. In this manner, torque distributed to the first clutch can be reduced, as compared to a clutch that selectively connects a second rotation element of a first planetary gear to an input member in a transmission in which a third rotation element of the first planetary gear is constantly coupled to an output member together with a fifth rotation element of a second planetary gear and the second rotation element of the first planetary gear is selectively connected to the input member, for example. Consequently, in this multiple speed transmission, the first clutch can be made compact in at least one of the axial direction and the radial direction. As a result, the multiple speed transmission can enhance both power transmission efficiency and drivability, and an increase in size of the entire apparatus can be suppressed.

A second engaging element of the six engaging elements may connect and disconnect the sixth rotation element of the second planetary gear to and from the first output element of the complex planetary gear train, a third engaging element of the six engaging elements may connect and disconnect the first rotation element of the first planetary gear and the fourth rotation element of the second planetary gear that are constantly coupled to each other to and from the second output element of the complex planetary gear train, a fourth engaging element of the six engaging elements may connect and disconnect the first rotation element of the first planetary gear and the fourth rotation element of the second planetary gear that are constantly coupled to each other to and from the first output element of the complex planetary gear train, a fifth engaging element of the six engaging elements may connect and non-rotatably hold the sixth rotation element of the second planetary gear stationary to the stationary member, and disconnect the sixth rotation element of the second planetary gear from the stationary member, and a sixth engaging element of the six engaging elements may connect and non-rotatably hold the fixable element of the complex planetary gear train stationary to the stationary member, and disconnect the fixable element of the complex planetary gear train from the stationary member.

In the multiple speed transmission according to preferred embodiments, the first through tenth forward speeds and the reverse speed are formed by engaging the first through sixth engaging elements in the following manner. That is, the first forward speed is formed by engaging the third engaging element, the fourth engaging element, and the fifth engaging element. The second forward speed is formed by engaging the fourth engaging element, the fifth engaging element, and the sixth engaging element. The third forward speed is formed by engaging the third engaging element, the fifth engaging element, and the sixth engaging element. The fourth forward speed is formed by engaging the first engaging element, the fifth engaging element, and the sixth engaging element. The fifth forward speed is formed by engaging the first engaging element, the third engaging element, and the sixth engaging element. The sixth forward speed is formed by engaging the first engaging element, the fourth engaging element, and the sixth engaging element. The seventh forward speed is formed by engaging the first engaging element, the second engaging element, and the fourth engaging element. The eighth forward speed is formed by engaging the first engaging element, the second engaging element, and the sixth engaging element. The ninth forward speed is formed by engaging the second engaging element, the fourth engaging element, and the sixth engaging element. The tenth forward speed is formed by engaging the second engaging element, the third engaging element, and the sixth engaging element. The reverse speed is formed by engaging the second engaging element, the third engaging element, and the fifth engaging element.

In this manner, in the multiple speed transmission according to invention preferred embodiment, the first through tenth forward speeds and the reverse speed are formed by engaging three of the six engaging elements, that is, the first through sixth engaging elements, and disengaging the other three engaging elements. Thus, the number of engaging elements disengaged with formation of shift speeds can be reduced, as compared to a transmission in which a plurality of shift speeds are formed by engaging two of six engaging elements and disengaging the other four engaging elements. As a result, drag loss in engaging elements disengaged with formation of shift speeds can be reduced, so that power transmission efficiency in the multiple speed transmission can be further enhanced.

In addition, the first planetary gear may be a single pinion type planetary gear including a first sun gear, a first ring gear, and a first carrier rotatably and revolvably holding a plurality of first pinion gears meshing with the first sun gear and the first ring gear, the second planetary gear may be a single pinion type planetary gear including a second sun gear, a second ring gear, and a second carrier rotatably and revolvably holding a plurality of second pinion gears meshing with the second sun gear and the second ring gear, and the first rotation element may be the first sun gear, the second rotation element may be the first carrier, the third rotation element may be the first ring gear, the fourth rotation element may be the second sun gear, the fifth rotation element may be the second carrier, and the sixth rotation element may be the second ring gear.

In this manner, since the first and second planetary gears are the single pinion type planetary gears, gear loss between rotation elements in the first and second planetary gears can be reduced, so that power transmission efficiency in the multiple speed transmission can be further enhanced and ease of assembly is enhanced while an increase in the weight of the entire apparatus is suppressed by reducing the number of components. Furthermore, since the first carrier of the first planetary gear is the second rotation element constantly coupled to the input member and the first ring gear of the first planetary gear is the third rotation element selectively connected to the output member by the first clutch, torque transmitted through the engaged first clutch can be reduced, so that torque distributed to the first clutch can be favorably reduced, as compared to a clutch that selectively connects a first carrier of a first planetary gear and an input member in a transmission in which the first ring gear of the first planetary gear is constantly coupled to an output member and the first carrier of the first planetary gear is selectively connected to the input member.

The complex planetary gear train may include a single pinion type third planetary gear including a third sun gear, a third ring gear, and a third carrier rotatably and revolvably holding a plurality of third pinion gears meshing with the third sun gear and the third ring gear, and also include a single pinion type fourth planetary gear including a fourth sun gear, a fourth ring gear, and a fourth carrier rotatably and revolvably holding a plurality of fourth pinion gears meshing with the fourth sun gear and the fourth ring gear, and the fixable element may be the third sun gear and the fourth sun gear that are constantly coupled to each other, the input element may be the third carrier, the first output element may be the third ring gear and the fourth carrier that are constantly coupled to each other, and the second output element may be the fourth ring gear. In this manner, the use of a Simpson type (SS-CR type) complex planetary gear train including two single pinion type planetary gears as the complex planetary gear train can further enhance power transmission efficiency in the multiple speed transmission by reducing gear loss between the rotation elements of the complex planetary gear train and enhance ease of assembly while an increase in the weight of the entire apparatus is suppressed by reducing the number of components. In addition, the third carrier of the third planetary gear constituting the Simpson type complex planetary gear train is constantly coupled to the input member, so that torque distributed to the third ring gear and the third sun gear can be reduced, and gear efficiency can be further enhanced, as compared to the case of employing a CR-CR type complex planetary gear train, for example.

Furthermore, the complex planetary gear train may include a single pinion type third planetary gear including a third sun gear, a third ring gear, and a third carrier rotatably and revolvably holding a plurality of third pinion gears meshing with the third sun gear and the third ring gear, and also include a single pinion type fourth planetary gear including a fourth sun gear, a fourth ring gear, and a fourth carrier rotatably and revolvably holding a plurality of fourth pinion gears meshing with the fourth sun gear and the fourth ring gear, and the fixable element may be the fourth sun gear, the input element may be the third ring gear and the fourth carrier that are constantly coupled to each other, the first output element may be the third carrier and the fourth ring gear that are constantly coupled to each other, and the second output element may be the third sun gear. In this manner, the use of the so-called CR-CR type complex planetary gear train including the two single pinion type planetary gears as the complex planetary gear train in this manner can also further enhance power transmission efficiency in the multiple speed transmission by reducing gear loss between rotation elements of the complex planetary gear train, and also enhance ease of assembly while an increase in the weight of the entire apparatus is suppressed by reducing the number of components.

The complex planetary gear train may be a Ravigneaux type planetary gear including a third sun gear, a fourth sun gear, a third pinion gear meshing with the third sun gear, a fourth pinion gear meshing with the fourth sun gear and meshing with the third pinion gear, a third carrier rotatably and revolvably holding the third and fourth pinion gears, and a third ring gear meshing with the fourth pinion gear, and the fixable element may be the fourth sun gear, the input element may be the fourth carrier, the first output element may be the third ring gear, and the second output element may be the third sun gear. In this manner, the use of the Ravigneaux type planetary gear as the complex planetary gear train can also enhance ease of assembly while an increase in the weight of the entire apparatus is suppressed by reducing the number of components.

The output member may be an output shaft coupled to a rear wheel of a vehicle through a differential gear. That is, the multiple speed transmission according to the preferred embodiment may be configured as a transmission to be installed in a rear-wheel-drive vehicle.

In this case, the first engaging element may include a piston and an engaging oil chamber defined by at least the piston and the output member, the output member may include an output member oil passage for supplying an engaging hydraulic pressure to the engaging oil chamber, the engaging oil chamber may directly communicate with the output member oil passage of the output member, the output member oil passage may communicate with an in-case oil passage formed in a case of the multiple speed transmission, and a pair of sealing members may be interposed between the case and the output shaft so as to sandwich a communication portion between the output member oil passage and the in-case oil passage in the front-rear direction. That is, the first clutch of the multiple speed transmission according to a preferred embodiment selectively connects the third rotation element of the first planetary gear to the output member (and the fifth rotation element of the second planetary gear). Thus, in the multiple speed transmission according to a preferred embodiment, the engaging oil chamber is defined by at least the piston and the output member, and an oil passage for supplying an engaging hydraulic pressure to the engaging oil chamber is formed in the output member, so that the engaging oil chamber of the first clutch can directly communicate with the oil passage of the output member.

In this manner, it is unnecessary to supply an engaging hydraulic pressure to the engaging oil chamber of the first clutch through the oil passage formed in the input member, and the engaging hydraulic pressure can be easily supplied from the output member to the engaging oil chamber of the first clutch. In a transmission in which a second rotation element (first carrier) of a first planetary gear is selectively connected to an input member by a clutch, for example, a member defining an engaging oil chamber of the clutch is disposed in the input member. Thus, an oil passage formed in the output member and an oil passage formed in the input member need to communicate with each other in order to supply an engaging hydraulic pressure from the output member to the engaging oil chamber. As a result, the number of sealing members increases disadvantageously. In this transmission, drag loss of oil may increase due to a rotation speed difference between the input member and the output member, and the amount of oil leakage increases to a degree corresponding to the increase in the number of sealing members, in a communication portion between the oil passage in the input member and the oil passage in the output member. On the other hand, in the multiple speed transmission according to a preferred embodiment, the engaging oil chamber of the first clutch can directly communicate with the oil passage in the output member. Thus, an increase in drag loss of oil as described above can be favorably suppressed, and an increase in the amount of oil leakage can be favorably suppressed by reducing the number of sealing members.

The complex planetary gear train may be disposed close to a motor of the vehicle, the first planetary gear may be disposed close to the output member, and the second planetary gear may be disposed between the complex planetary gear train and the first planetary gear.

The output member may be a counter drive gear included in a gear train that transmits power to a differential gear coupled to a front wheel of a vehicle. That is, the multiple speed transmission according to a preferred embodiment may be configured as a transmission to be installed in a front-wheel-drive vehicle.

BRIEF DESCRIPTION OF THE DRAWINGS

FIG. 3 is an operation table showing relationships between shift speeds and operating states of clutches and brakes in the multiple speed transmission illustrated in FIG. 1.

MODES FOR CARRYING OUT THE INVENTION

Next, embodiments will be described with reference to the drawings.

Figure 1:
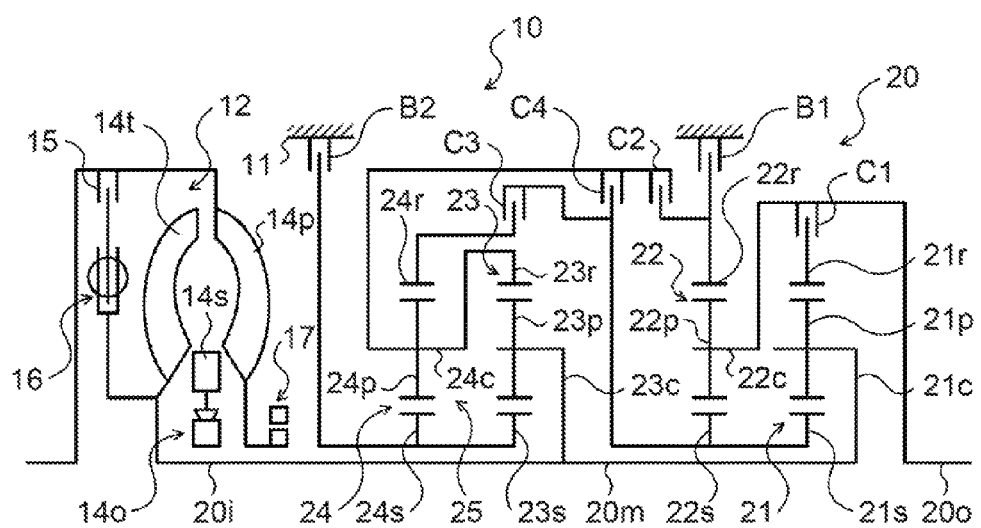
FIG. 1 schematically illustrates a configuration of a power transmission device including a multiple speed transmission according to an embodiment.

FIG. 1 schematically illustrates a configuration of a power transmission device 10 including an automatic transmission 20 as a multiple speed transmission according to an embodiment. The power transmission device 10 illustrated in FIG. 1 is connected to a crankshaft of an engine (internal combustion engine) (not shown) vertically mounted in a front portion of a rear-wheel-drive vehicle, and can transmit power (torque) from the engine to left and right rear wheels (drive wheels) (not shown). As illustrated in FIG. 1, the power transmission device 10 includes, for example, a transmission case (stationary member) 11, a starting device (fluid transmission device) 12, and an oil pump 17, as well as the automatic transmission 20.

The starting device 12 includes a torque converter having, for example, an input-side pump impeller 14p coupled to the crankshaft of the engine, an output-side turbine runner 14t coupled to an input shaft (input member) 20i of the automatic transmission 20, a stator 14s disposed inside the pump impeller 14p and the turbine runner 14t to rectify a flow of hydraulic oil from the turbine runner 14t to the pump impeller 14p, and a one-way clutch 14o regulating a rotation direction of the stator 14s to one direction. The starting device 12 also includes a lockup clutch 15 connecting and disconnecting a front cover coupled to the crankshaft of the engine to and from the input shaft 20i of the automatic transmission 20, and a damper mechanism 16 attenuating vibrations between the front cover and the input shaft 20i of the automatic transmission 20. The starting device 12 may include a fluid coupling that does not include the stator 14s.

The oil pump 17 is configured as a gear pump including, for example, a pump assembly including a pump body and a pump cover, an external gear (inner rotor) coupled to the pump impeller 14p of the starting device 12, and an internal gear (outer rotor) meshing with the external gear. The oil pump 17 is driven by power form the engine, intakes hydraulic oil (ATF) stored in an oil pan (not shown), and pumps the hydraulic oil to a hydraulic control device (not shown).

The automatic transmission 20 is configured as a transmission of a ten-speed transmission. As illustrated in FIG. 1, the automatic transmission 20 includes an output shaft (output member) 20o coupled to the left and right rear wheels through a differential gear and a drive shaft (not shown), single pinion type first and second planetary gears 21 and 22, and a Simpson type complex planetary gear train 25 including single pinion type third and fourth planetary gears 23 and 24, as well as the input shaft 20i. The automatic transmission 20 also includes a first clutch C1, a second clutch C2, a third clutch C3, a fourth clutch C4, a first brake B1, and a second brake B2 for changing a power transmission path from the input shaft 20i to the output shaft 20o.

In this embodiment, the first and second planetary gears 21 and 22 and the complex planetary gear train 25 are disposed in the transmission case 11 in such a manner that the complex planetary gear train 25, the second planetary gear 22, the first planetary gear 21, that is, the fourth planetary gear 24, the third planetary gear 23, the second planetary gear 22, and the first planetary gear 21, are arranged in this order from the starting device 12, that is, from the engine side (the left side in FIG. 1). In this manner, the complex planetary gear train 25 (fourth planetary gear 24) is disposed in the front portion of the vehicle so as to be proximate to the engine (not shown). The first planetary gear 21 is disposed in a rear portion of the vehicle so as to be proximate to the output shaft 20o. The second planetary gear 22 is disposed between the complex planetary gear train 25 (third planetary gear 23) and the first planetary gear 21.

The first planetary gear 21 includes a first sun gear 21s that is an external gear, a first ring gear 21r that is an internal gear concentric with the first sun gear 21s, a plurality of first pinion gears 21p meshing with the first sun gear 21s and the first ring gear 21r, and a first carrier 21c rotatably (turnably) and revolvably holding the first pinion gears 21p. In this embodiment, a gear ratio $\lambda 1$ (the number of teeth of the first sun gear 21s/the number of teeth of the first ring gear 21r) of the first planetary gear 21 is defined as $\lambda 1=0.333$, for example.

As illustrated in FIG. 1, the first carrier 21c of the first planetary gear 21 is constantly coupled (fixed) to an intermediate shaft 20m of the automatic transmission 20 coupled to the input shaft 20i. In this manner, while power is transmitted from the engine to the input shaft 20i, power from the engine is constantly transmitted to the first carrier 21c through the input shaft 20i and the intermediate shaft 20m. Thus, the first carrier 21c functions as an input element (first input element of the automatic transmission 20) of the first planetary gear 21. The first ring gear 21r of the first planetary gear 21 functions as an output element (first output element of the automatic transmission 20) of the first planetary gear 21.

The second planetary gear 22 includes a second sun gear 22s that is an external gear, a second ring gear 22r that is an internal gear concentric with the second sun gear 22s, a plurality of second pinion gears 22p meshing with the second sun gear 22s and the second ring gear 22r, and a second carrier 22c rotatably (turnably) and revolvably holding the second pinion gears 22p. In this embodiment, a gear ratio $\lambda 2$ (the number of teeth of the second sun gear 22s/the number of teeth of the second ring gear 22r) of the second planetary gear 22 is defined as $\lambda 2=0.278$, for example.

As illustrated in FIG. 1, the second sun gear 22s of the second planetary gear 22 is integrally coupled (constantly coupled) to the first sun gear 21s of the first planetary gear 21, and constantly (and coaxially) rotates or stops together with the first sun gear 21s. The first sun gear 21s and the second sun gear 22s may be separate gears and constantly coupled to each other through a coupling member (first coupling member) (not shown). The second carrier 22c of the second planetary gear 22 is constantly coupled to the output shaft 20o, and constantly (and coaxially) rotates or stops together with the output shaft 20o. In this manner, the second carrier 22c functions as an output element (second output element of the automatic transmission 20) of the second planetary gear 22. In addition, the second ring gear 22r of the second planetary gear 22 functions as a fixable element (first fixable element of the automatic transmission 20) of the second planetary gear 22.

The third planetary gear 23 constituting the complex planetary gear train 25 includes a third sun gear 23s that is an external gear, a third ring gear 23r that is an internal gear concentric with the third sun gear 23s, a plurality of third pinion gears 23p meshing with the third sun gear 23s and the third ring gear 23r, and a third carrier 23c rotatably (turnably) and revolvably holding the third pinion gears 23p. In this embodiment, a gear ratio X3 (the number of teeth of the third sun gear 23s/the number of teeth of the third ring gear 23r) of the third planetary gear 23 is defined as λ3=0.453, for example.

The fourth planetary gear 24 constituting the complex planetary gear train 25 includes a fourth sun gear 24s that is an external gear, a fourth ring gear 24r that is an internal gear concentric with the fourth sun gear 24s, a plurality of fourth pinion gears 24p meshing with the fourth sun gear 24s and the fourth ring gear 24r, and a fourth carrier 24c rotatably (turnably) and revolvably holding the fourth pinion gears 24p. In this embodiment, a gear ratio λ4 (the number of teeth of the fourth sun gear 24s/the number of teeth of the fourth ring gear 24r) of the fourth planetary gear 24 is defined as λ4=0.360, for example.

As illustrated in FIG. 1, the third sun gear 23s of the third planetary gear 23 and the fourth sun gear 24s of the fourth planetary gear 24 are integrally coupled (constantly coupled) to each other, and constantly (and coaxially) rotate or stop together. The third sun gear 23s and the fourth sun gear 24s that are thus constantly coupled to each other function as a fixable element (second fixable element of the automatic transmission 20) of the complex planetary gear train 25. As illustrated in FIG. 1, the third carrier 23c of the third planetary gear 23 is constantly coupled (fixed) to the input shaft 20i, and is constantly coupled to the first carrier 21c of the first planetary gear 21 through the intermediate shaft 20m as the coupling member (second coupling member). In this manner, while power is transmitted from the engine to the input shaft 20i, power from the engine is constantly transmitted to the third carrier 23c through the input shaft 20i. Thus, the third carrier 23c functions as an input element (the second input element of the automatic transmission 20) of the complex planetary gear train 25. In addition, as illustrated in FIG. 1, the third ring gear 23r of the third planetary gear 23 and the fourth carrier 24c of the fourth planetary gear 24 are integrally coupled (constantly coupled) to each other, and constantly (and coaxially) rotate or stop together. The third ring gear 23r and the fourth carrier 24c that are thus constantly coupled to each other function as a first output element (third output element of the automatic transmission 20) of the complex planetary gear train 25. The fourth ring gear 24r of the fourth planetary gear 24 functions as a second output element (fourth output element of the automatic transmission 20) of the complex planetary gear train 25.

The first clutch C1 connects and disconnects the first ring gear 21r that is an output element of the first planetary gear 21 to and from the output shaft 20o. In this embodiment, the first clutch C1 is disposed in the rear side of the vehicle (the right side in FIG. 1) with respect to the first planetary gear 21 in such a manner that the first clutch C1 is closest to the output shaft 20o among the six elements of the clutches C1 to C4 and the brakes B1 and B2. The second clutch C2 connects and disconnects the second ring gear 22r of the second planetary gear 22 to and from the third ring gear 23r and the fourth carrier 24c that are the first output element of the complex planetary gear train 25. In this embodiment, the second clutch C2 is disposed between the second planetary gear 22 and the complex planetary gear train 25 (third planetary gear 23) so as to be proximate to the second planetary gear 22.

The third clutch C3 connects and disconnects the first sun gear 21s of the first planetary gear 21 and the second sun gear 22s of the second planetary gear 22 to and from the fourth ring gear 24r that is the second output element of the complex planetary gear train 25. In this embodiment, the third clutch C3 is disposed so as to surround at least a part of the third planetary gear 23. The fourth clutch C4 connects and disconnects the first sun gear 21s of the first planetary gear 21 and the second sun gear 22s of the second planetary gear 22 to and from the third ring gear 23r and the fourth carrier 24c that are the first output element of the complex planetary gear train 25. In this embodiment, the fourth clutch C4 is disposed between the second clutch C2 and the third clutch C3 so as to be proximate to the complex planetary gear train 25 (third planetary gear 23).

The first brake B1 non-rotatably holds (connects) the second ring gear 22r that is the fixable element of the second planetary gear 22 stationary to the transmission case 11 as the stationary member, and releases the second ring gear 22r from the transmission case 11 such that the second ring gear 22r is rotatable. In this embodiment, the first brake B1 is disposed so as to surround at least a part of the second clutch C2. The second brake B2 non-rotatably holds (connects) the third sun gear 23s and the fourth sun gear 24s that are the fixable element of the complex planetary gear train 25 stationary to the transmission case 11 as the stationary member, and releases the third sun gear 23s and the fourth sun gear 24s from the transmission case 11 such that the third sun gear 23s and the fourth sun gear 24s are rotatable. In this embodiment, the second brake B2 is disposed so as to surround at least a part of the fourth planetary gear 24.

In this embodiment, as the first through fourth clutches C1 to C4, a multi-plate friction hydraulic clutch (friction engagement element) including a hydraulic servo composed of, for example, a piston, a plurality of frictional engaging plates (friction plates and separator plates), and an engaging oil chamber to which hydraulic oil is supplied is employed. As the first and second brakes B1 and B2, a multi-plate friction hydraulic brake including a hydraulic servo composed of, for example, a piston, a plurality of frictional engaging plates (friction plates and separator plates) and an engaging oil chamber to which hydraulic oil is supplied is employed. The first through fourth clutches C1 to C4 and the first and second brakes B1 and B2 operate in response to supply and discharge of hydraulic oil performed by the hydraulic control device (not shown).

Figure 2:
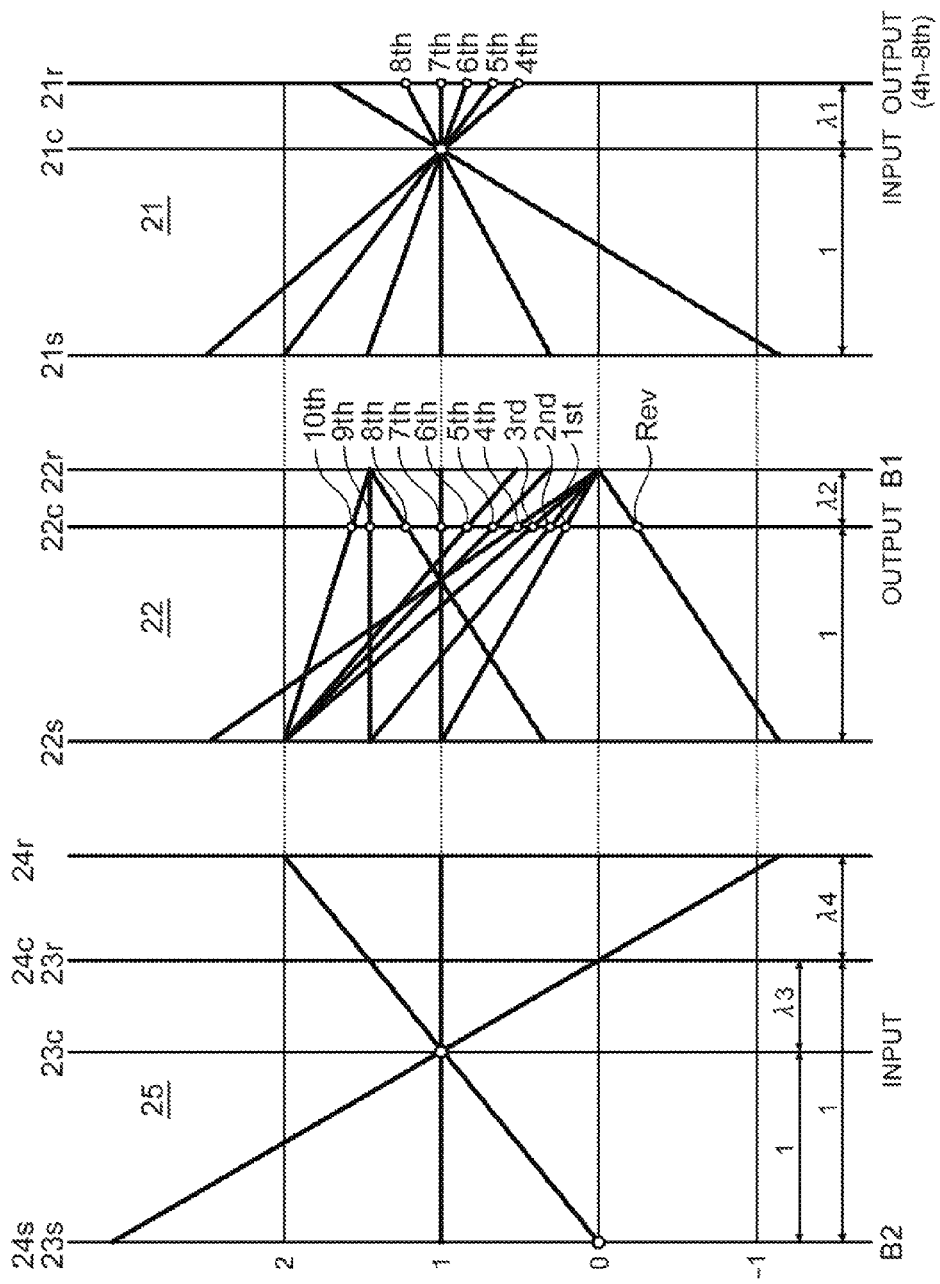
FIG. 2 shows velocity diagrams showing rotation speed ratios of rotation elements to an input rotation speed in the multiple speed transmission illustrated in FIG. 1.

FIG. 2 shows velocity diagrams showing rotation speed ratios of rotation elements to a rotation speed (input rotation speed) of the input shaft 20i in the automatic transmission 20 (where the rotation speed of the input shaft 20i, that is, the first carrier 21c and the third carrier 23c, is a value 1 (one)). FIG. 3 is an operation table showing relationships between the shift speeds of the automatic transmission 20 and operating states of the first through fourth clutches C1 to C4 and the first and second brakes B1 and B2.

As shown in FIG. 2, the three rotation elements constituting the single pinion type first planetary gear 21, that is, the first sun gear 21s, the first ring gear 21r, and the first carrier 21c, are arranged in the order of the first sun gear 21s, the first carrier 21c, and the first ring gear 21r from the left in FIG. 2 with intervals in accordance with the gear ratio 21 on the velocity diagram for the first planetary gear 21 (the right velocity diagram in FIG. 2). Based on this order on the velocity diagram, according to a preferred embodiment, the first sun gear 21s serves as a first rotation element of the automatic transmission 20, the first carrier 21c serves as a second rotation element of the automatic transmission 20, and the first ring gear 21r serves as a third rotation element of the automatic transmission 20. Thus, the first planetary gear 21 includes the first rotation element, the second rotation element, and the third rotation element of the automatic transmission 20 that are arranged in order with intervals in accordance with the gear ratio λ1 on the velocity diagram.

The three rotation elements constituting the single pinion type second planetary gear 22, that is, the second sun gear 22s, the second ring gear 22r, and the second carrier 22c, are arranged in the order of the second sun gear 22s, the second carrier 22c, and the second ring gear 22r from the left in FIG. 2 in accordance with the gear ratio λ2 on the velocity diagram for the second planetary gear 22 (the middle velocity diagram in FIG. 2). Based on this order on the velocity diagram, according to a preferred embodiment, the second sun gear 22s serves as a fourth rotation element of the automatic transmission 20, the second carrier 22c serves as a fifth rotation element of the automatic transmission 20, and the second ring gear 22r serves as a sixth rotation element of the automatic transmission 20. Thus, the second planetary gear 22 includes the fourth rotation element, the fifth rotation element, and the sixth rotation element of the automatic transmission 20 that are arranged in order with intervals in accordance with the gear ratio λ2 on the velocity diagram.

The four rotation elements constituting the Simpson type complex planetary gear train 25, that is, the third sun gear 23s and the fourth sun gear 24s as the fixable element, the third carrier 23c as the input element, the third ring gear 23r and the fourth carrier 24c as the first output element, and the fourth ring gear 24r as the second output element are arranged in this order from the left in FIG. 2 with intervals in accordance with gear ratios λ3 and λ4 of the third and fourth planetary gears 23 and 24 on the velocity diagram for the complex planetary gear train 25 (the left velocity diagram in FIG. 2). Based on this order on the velocity diagram, according to a preferred embodiment, the third sun gear 23s and the fourth sun gear 24s serve as a seventh rotation element of the automatic transmission 20, the third carrier 23c serves as an eighth rotation element of the automatic transmission 20, the third ring gear 23r and the fourth carrier 24c serve as a ninth rotation element of the automatic transmission 20, and the fourth ring gear 24r serves as a tenth rotation element of the automatic transmission 20. Thus, the complex planetary gear train 25 includes the seventh rotation element, the eighth rotation element, the ninth rotation element, and the tenth rotation element of the automatic transmission 20 arranged in order with intervals in accordance with the gear ratios λ3 and λ4 on the velocity diagram.

In the automatic transmission 20, the first through fourth clutches C1 to C4 and the first and second brakes B1 and B2 are engaged or disengaged as illustrated in FIG. 3 to change connection relationships among the above-described first through tenth rotation elements (that are actually nine rotation elements in total because the first rotation element and the fourth rotation element are constantly coupled to each other), thereby setting ten power transmission paths in a forward rotation direction and one power transmission path in a reverse rotation direction, that is, forward speeds from a first speed to a tenth speed and a reverse speed, between the input shaft 20i and the output shaft 20o.

Specifically, the first forward speed is formed by engaging the third clutch C3, the fourth clutch C4, and the first brake B1, and disengaging the other clutches C1 and C2 and the brake B2. More specifically, to form the first forward speed, the third clutch C3 connects the first sun gear 21s of the first planetary gear 21 and the second sun gear 22s of the second planetary gear 22 to the fourth ring gear 24r (second output element) of the complex planetary gear train 25, the fourth clutch C4 connects the first sun gear 21s of the first planetary gear 21 and the second sun gear 22s of the second planetary gear 22 to the third ring gear 23r and the fourth carrier 24c (first output element) of the complex planetary gear train 25, and the first brake B1 non-rotatably holds the second ring gear 22r (fixable element) of the second planetary gear 22 stationary to the transmission case 11. In this embodiment (the case where the gear ratios of the first through fourth planetary gears 21 to 24 are λ1=0.333, λ2=0.278, λ3=0.453, and λ4=0.360, the same holds hereinafter), a gear ratio (rotation speed of the input shaft 20i/rotation speed of the output shaft 20o) γ1 in the first forward speed is γ1=4.597.

The second forward speed is formed by engaging the fourth clutch C4, the first brake B1, and the second brake B2, and disengaging the other clutches C1, C2, and C3. Specifically, to form the second forward speed, the fourth clutch C4 connects the first sun gear 21s of the first planetary gear 21 and the second sun gear 22s of the second planetary gear 22 to the third ring gear 23r and the fourth carrier 24c (first output element) of the complex planetary gear train 25, the first brake B1 non-rotatably holds the second ring gear 22r (fixable element) of the second planetary gear 22 stationary to the transmission case 11, and the second brake B2 non-rotatably holds the third sun gear 23s and the fourth sun gear 24s (fixable element) of the complex planetary gear train 25 stationary to the transmission case 11. In this embodiment, a gear ratio γ2 in the second forward speed is γ2=3.164. A step ratio between the first forward speed and the second forward speed is γ1/γ2=1.453.

The third forward speed is formed by engaging the third clutch C3, the first brake B1, and the second brake B2, and disengaging the other clutches C1, C2, and C4. Specifically, to form the third forward speed, the third clutch C3 connects the first sun gear 21s of the first planetary gear 21 and the second sun gear 22s of the second planetary gear 22 to the fourth ring gear 24r (second output element) of the complex planetary gear train 25, the first brake B1 non-rotatably holds the second ring gear 22r (fixable element) of the second planetary gear 22 stationary to the transmission case 11, and the second brake B2 non-rotatably holds the third sun gear 23s and the fourth sun gear 24s (fixable element) of the complex planetary gear train 25 stationary to the transmission case 11. In this embodiment, a gear ratio γ3 in the third forward speed is γ3=2.326. A step ratio between the second forward speed and the third forward speed is γ2/γ3=1.360.

The fourth forward speed is formed by engaging the first clutch C1, the first brake B1, and the second brake B2, and disengaging the other clutches C2, C3, and C4. Specifically, to form the fourth forward speed, the first clutch C1 connects the first ring gear 21r (output element) of the first planetary gear 21 to the output shaft 20o, the first brake B1 non-rotatably holds the second ring gear 22r (fixable element) of the second planetary gear 22 stationary to the transmission case 11, and the second brake B2 non-rotatably holds the third sun gear 23s and the fourth sun gear 24s (fixable element) of the complex planetary gear train 25 stationary to the transmission case 11. In this embodiment, a gear ratio γ4 in the fourth forward speed is γ4=1.899. A step ratio between the third forward speed and the fourth forward speed is γ3/γ4=1.225.

The fifth forward speed is formed by engaging the first clutch C1, the third clutch C3, and the second brake B2, and disengaging the other clutches C2 and C4 and the brake B1. Specifically, to form the fifth forward speed, the first clutch C1 connects the first ring gear 21r (output element) of the first planetary gear 21 to the output shaft 20o, the third clutch C3 connects the first sun gear 21s of the first planetary gear 21 and the second sun gear 22s of the second planetary gear 22 to the fourth ring gear 24r (second output element) of the complex planetary gear train 25, and the second brake B2 non-rotatably holds the third sun gear 23s and the fourth sun gear 24s (fixable element) of the complex planetary gear train 25 stationary to the transmission case 11. In this embodiment, a gear ratio γ5 in the fifth forward speed is γ5=1.482. A step ratio between the fourth forward speed and the fifth forward speed is γ4/γ5=1.281.

The sixth forward speed is formed by engaging the first clutch C1, the fourth clutch C4, and the second brake B2, and disengaging the other clutches C2 and C3 and the brake B1. Specifically, to form the sixth forward speed, the first clutch C1 connects the first ring gear 21r (output element) of the first planetary gear 21 to the output shaft 20o, the fourth clutch C4 connects the first sun gear 21s of the first planetary gear 21 and the second sun gear 22s of the second planetary gear 22 to the third ring gear 23r and the fourth carrier 24c (first output element) of the complex planetary gear train 25, and the second brake B2 non-rotatably holds the third sun gear 23s and the fourth sun gear 24s (fixable element) of the complex planetary gear train 25 stationary to the transmission case 11. In this embodiment, a gear ratio γ6 in the sixth forward speed is γ6=1.482. A step ratio between the fifth forward speed and the sixth forward speed is γ5/γ6=1.258.

The seventh forward speed is formed by engaging the first clutch C1, the second clutch C2, and the fourth clutch C4, and disengaging the other clutch C3 and brakes B1 and B2. Specifically, to form the seventh forward speed, the first clutch C1 connects the first ring gear 21r (output element) of the first planetary gear 21 to the output shaft 20o, the second clutch C2 connects the second ring gear 22r of the second planetary gear 22 to the third ring gear 23r and the fourth carrier 24c (first output element) of the complex planetary gear train 25, and the fourth clutch C4 connects the first sun gear 21s of the first planetary gear 21 and the second sun gear 22s of the second planetary gear 22 to the third ring gear 23r and the fourth carrier 24c (first output element) of the complex planetary gear train 25. In this embodiment, a gear ratio γ7 in the seventh forward speed is γ7=1.000. A step ratio between the sixth forward speed and the seventh forward speed is γ6/γ7=1.178.

The eighth forward speed is formed by engaging the first clutch C1, the second clutch C2, and the second brake B2, and disengaging the other clutches C3 and C4 and the brake B1. Specifically, to form the eighth forward speed, the first clutch C1 connects the first ring gear 21r (output element) of the first planetary gear 21 to the output shaft 20o, the second clutch C2 connects the second ring gear 22r of the second planetary gear 22 to the third ring gear 23r and the fourth carrier 24c (first output element) of the complex planetary gear train 25, and the second brake B2 non-rotatably holds the third sun gear 23s and the fourth sun gear 24s (fixable element) of the complex planetary gear train 25 stationary to the transmission case 11. In this embodiment, a gear ratio γ8 in the eighth forward speed is γ8=0.823. A step ratio between the seventh forward speed and the eighth forward speed is γ7/γ8=1.214.

The ninth forward speed is formed by engaging the second clutch C2, the fourth clutch C4, and the second brake B2, and disengaging the other clutches C1 and C3 and the brake B1. Specifically, to form the ninth forward speed, the second clutch C2 connects the second ring gear 22r of the second planetary gear 22 to the third ring gear 23r and the fourth carrier 24c (first output element) of the complex planetary gear train 25, the fourth clutch C4 connects the first sun gear 21s of the first planetary gear 21 and the second sun gear 22s of the second planetary gear 22 to the third ring gear 23r and the fourth carrier 24c (first output element) of the complex planetary gear train 25, and the second brake B2 non-rotatably holds the third sun gear 23s and the fourth sun gear 24s (fixable element) of the complex planetary gear train 25 stationary to the transmission case 11. In this embodiment, a gear ratio γ9 in the ninth forward speed is γ9=0.688. A step ratio between the eighth forward speed and the ninth forward speed is γ8/γ9=1.196.

The tenth forward speed is formed by engaging the second clutch C2, the third clutch C3, and the second brake B2, and disengaging the other clutches C1 and C4 and the brake B1. Specifically, to form the tenth forward speed, the second clutch C2 connects the second ring gear 22r of the second planetary gear 22 to the third ring gear 23r and the fourth carrier 24c (first output elements) of the complex planetary gear train 25, the third clutch C3 connects the first sun gear 21s of the first planetary gear 21 and the second sun gear 22s of the second planetary gear 22 to the fourth ring gear 24r (second output element) of the complex planetary gear train 25, and the second brake B2 non-rotatably holds the third sun gear 23s and the fourth sun gear 24s (fixable elements) of the complex planetary gear train 25 stationary to the transmission case 11. In this embodiment, a gear ratio γ10 in the tenth forward speed is γ10=0.638. A step ratio between the ninth forward speed and the tenth forward speed is γ9/γ10=1.078. In the automatic transmission 20, a spread (gear ratio width=gear ratio γ1 in first forward speed as lowest shift speed/gear ratio γ10 in tenth forward speed as highest shift speed) is γ1/γ10=7.203.

The reverse speed is formed by engaging the second clutch C2, the third clutch C3, and the first brake B1, and disengaging the other clutches C1 and C4 and the brake B2. Specifically, to form the reverse speed, the second clutch C2 connects the second ring gear 22r of the second planetary gear 22 to the third ring gear 23r and the fourth carrier 24c (first output element) of the complex planetary gear train 25, the third clutch C3 connects the first sun gear 21s of the first planetary gear 21 and the second sun gear 22s of the second planetary gear 22 to the fourth ring gear 24r (second output element) of the complex planetary gear train 25, and the first brake B1 non-rotatably holds the second ring gear 22r (fixable element) of the second planetary gear 22 stationary to the transmission case 11. In this embodiment, a gear ratio γrev in the reverse speed is γrev=−3.981. A step ratio between the first forward speed and the reverse speed is |γrev/γ1|=0.866.

As described above, the automatic transmission 20 can provide the forward speeds from the first speed to the tenth speed and the reverse speed by engaging and disengaging the first through fourth clutches C1 to C4 and the first and second brakes B1 and B2. As a result, the automatic transmission 20 can enhance power transmission efficiency, that is, the fuel efficiency and acceleration performance of a vehicle, by increasing the spread (to 7.203 in this embodiment) and also enhance shifting feeling (feeling of acceleration and deceleration before and after shifting) by optimizing the step ratios (suppressing increases thereof). Thus, the automatic transmission 20 can favorably enhance both power transmission efficiency and drivability.

In the automatic transmission 20, the first through tenth forward speeds and the reverse speed can be formed by engaging three of the six engaging elements, that is, the first through fourth clutches C1 to C4 and the first and second brakes B1 and B2, and disengaging the other three engaging elements. In this manner, as compared to a transmission that forms a plurality of shift speeds by engaging two of the six elements of clutches and brakes and disengaging the other four elements, for example, the number of engaging elements to be disengaged with formation of shift speeds can be reduced. As a result, drag loss due to slight contact between members of engaging elements disengaged with formation of shift speeds can be reduced, thereby further enhancing power transmission efficiency in the automatic transmission 20.

In addition, in the automatic transmission 20, in a manner similar to the third carrier 23c (input element) of the complex planetary gear train 25, the first carrier 21c (second rotation element) of the first planetary gear 21 is constantly coupled to the input shaft 20i through the intermediate shaft 20m, and in forming the fourth to eighth forward speeds, the first clutch C1 connects the first ring gear 21r (third rotation element) of the first planetary gear 21 to the output shaft 20o (the second carrier 22c of the second planetary gear 22). In this manner, torque distributed to the first clutch C1 can be reduced, as compared to the transmission (see FIG. 2 of Patent Document 1) in which the first ring gear (third rotation element) of the first planetary gear is constantly coupled to the output shaft together with the second carrier (fifth rotation element) of the second planetary gear, and the first carrier (second rotation element) of the first planetary gear is selectively connected to the input shaft by a clutch, for example.

That is, the first carrier 21c of the first planetary gear 21 serves as the second rotation element constantly coupled to the input shaft 20i and the first ring gear 21r of the first planetary gear 21 serves as the third rotation element selectively connected to the output shaft 20o by the first clutch C1, so that torque transmitted through the engaged first clutch C1 can be reduced (to $1/(1+\lambda 1)$), as compared to a clutch that selectively connects a first carrier of a first planetary gear to an input shaft in a transmission in which a first ring gear of the first planetary gear is constantly coupled to an output shaft together with a second carrier of a second planetary gear 22 and the first carrier of the first planetary gear is selectively connected to the input shaft. Thus, the automatic transmission 20 can favorably reduce the torque distributed to the first clutch C1. Consequently, in the automatic transmission 20, the first clutch C1 can be made compact in at least one of the axial direction and the radial direction. As a result, the automatic transmission 20 can enhance both power transmission efficiency and drivability, and an increase in size of the entire apparatus can be suppressed.

Since the first and second planetary gears 21 and 22 are the single pinion type planetary gears, gear loss between rotation elements of the first and second planetary gears 21 and 22 is reduced, so that power transmission efficiency in the automatic transmission 20 can be further enhanced and ease of assembly can be enhanced while an increase in the weight of the entire apparatus is suppressed by reducing the number of components, as compared to a case where the first and second planetary gears 21 and 22 are double pinion type planetary gears, for example. Furthermore, as in the automatic transmission 20, the use of the Simpson type (SS-CR type) complex planetary gear train 25 including the two single pinion type third and fourth planetary gears 23 and 24 can further enhance power transmission efficiency in the automatic transmission 20 by reducing gear loss between rotation elements of the complex planetary gear train 25 and enhance ease of assembly while an increase in the weight of the entire apparatus is suppressed by reducing the number of components. Moreover, the third carrier 23c of the third planetary gear 23 constituting the Simpson type complex planetary gear train 25 is constantly coupled to the input shaft 20i, so that torque distributed to the third ring gear 23r and the third sun gear 23s can be reduced and gear efficiency can be further enhanced, as compared to the case in which a CR-CR type complex planetary gear train is employed, for example.

Figure 4:
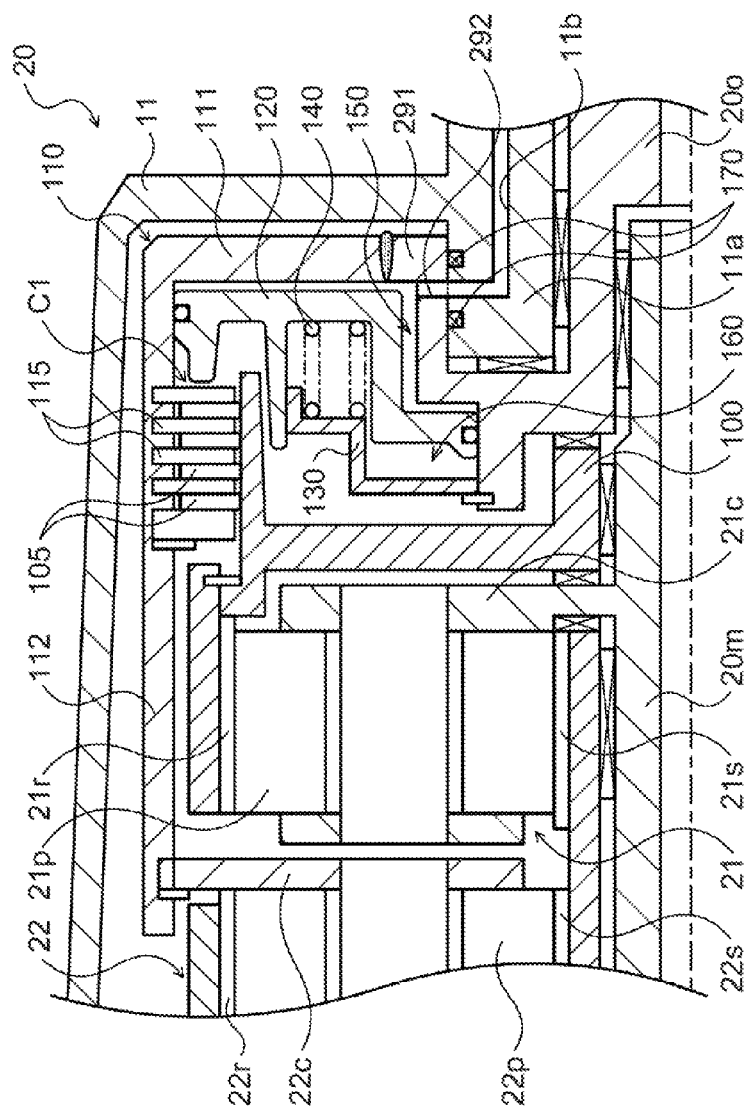
FIG. 4 is an enlarged cross-sectional view illustrating a main portion of the multiple speed transmission illustrated in FIG. 1.

FIG. 4 is an enlarged cross-sectional view illustrating a main portion of the automatic transmission 20. FIG. 4 illustrates a configuration of the periphery of the first clutch C1 of the automatic transmission 20. As illustrated in FIG. 4, the first clutch C1 includes a clutch hub 100, a clutch drum 110, a plurality of friction plates (first frictional engaging plates) 105 whose inner peripheral portions are fitted to the clutch hub 100 and which are movably supported by the clutch hub 100, and a plurality of separator plates (second frictional engaging plates) 115 whose outer peripheral portions are fitted to the clutch drum 110 and movably supported by the clutch drum 110.

The clutch hub 100 of the first clutch C1 is rotatably supported by the intermediate shaft 20m through a radial bearing, and is supported in the axial direction by the output shaft 20o and the first carrier 21c of the first planetary gear 21 fixed to or integrated with the intermediate shaft 20m through two front and rear thrust bearings. In addition, the clutch hub 100 is fixed to the first ring gear 21r of the first planetary gear 21 through a spline and a snap ring, and constantly (and coaxially) rotates or stops together with the first ring gear 21r. Each of the friction plates 105 fitted to the clutch hub 100 is configured by bonding a friction material to each surface of a ring-shaped member.

The clutch drum 110 of the first clutch C1 includes a ring-shaped wall 111 fixed to an increased-diameter portion 291 of the output shaft 20o by, for example, welding and an outer cylinder 112 extending from the outer peripheral portion of the ring-shaped wall 111 in the axial direction of, for example, the output shaft 20o. The clutch drum 110 may be configured by joining the ring-shaped wall 111 and the outer cylinder 112 as separate members. A spline to be engaged with the outer peripheral portion of the separator plate 115 is formed on the inner peripheral surface of the outer cylinder 112, and a free end of the outer cylinder 112 is fixed to the second carrier 22c of the second planetary gear 22 through the spline and the snap ring. In this manner, the clutch drum 110 constantly (and coaxially) rotates or stops together with the output shaft 20o and the second carrier 22c of the second planetary gear 22. Each of the separator plates 115 fitted to the clutch drum 110 is a ring-shaped member whose both surfaces are smooth.

The first clutch C1 also includes a piston 120 pressing the separator plates 115 and the friction plates 105 to allow them to be frictionally engaged, a cancel plate (cancel oil chamber defining member) 130, and a plurality of return springs 140. The piston 120 is movably supported by the output shaft 20o in the axial direction so as to be located closer to the first planetary gear 21 (to the front of the vehicle) than the ring-shaped wall 111, in the outer cylinder 112 of the clutch drum 110, and defines an engaging oil chamber 150 together with the clutch drum 110, as an oil chamber defining portion rotating together with the output shaft 20o, and the output shaft 20o. The cancel plate 130 is attached to the output shaft 20o so as to be located closer to the first planetary gear 21 (to the front of the vehicle) than the piston 120, and defines a cancel oil chamber 160 for cancelling a centrifugal hydraulic pressure generated in the engaging oil chamber 150 together with the piston 120. The return springs 140 are arranged with intervals in a circumferential direction between the piston 120 and the cancel plate 130.

As illustrated in FIG. 4, the output shaft 20o is rotatably supported by a shaft support portion 11a formed in the transmission case 11 through a radial bearing and a thrust bearing. The shaft support portion 11a of the transmission case 11 has an in-case oil passage 11b connected to the hydraulic control device (not shown), and an engaging hydraulic pressure (hydraulic oil) from the hydraulic control device to the first clutch C1 is supplied to the in-case oil passage 11b. An oil passage (output member oil passage) 292 is formed near the increased-diameter portion 291 of the output shaft 20o so as to directly communicate with the engaging oil chamber 150 of the first clutch C1 and with the in-case oil passage 11b of the transmission case 11. A pair of (two) sealing members 170 is interposed between the shaft support portion 11a of the transmission case 11 and the output shaft 20o so as to sandwich a communication portion between the in-case oil passage 11b and the oil passage 292 in the front-rear direction.

In this manner, an engaging hydraulic pressure from the hydraulic control device is supplied to the engaging oil chamber 150 of the first clutch C1 through the in-case oil passage 11b of the transmission case 11 and the oil passage 292 of the output shaft 20o. When the piston 120 moves in the axial direction of the output shaft 20o to press the separator plates 115 and the friction plates 105 in accordance with an increase in a hydraulic pressure in the engaging oil chamber 150, the first clutch C1 is engaged, so that the first ring gear 21r of the first planetary gear 21 and the output shaft 20o are connected to each other. Hydraulic oil (for example, drain oil) from the hydraulic control device is supplied to the cancel oil chamber 160 of the first clutch C1 through an oil passage (not shown) formed in, for example, the output shaft 20o.

In this manner, in the first clutch C1 selectively connecting the first ring gear 21r of the first planetary gear 21 to the output shaft 20o coupled to the rear wheels of the vehicle through the differential gear, the engaging oil chamber 150 can be defined by the clutch drum 110 as the oil chamber defining portion rotating together with the output shaft 20o, the piston 120, and the output shaft 20o. In addition, in the first clutch C1, the oil passage 292 for supplying an engaging hydraulic pressure to the engaging oil chamber 150 is formed in the output shaft 20o, so that the engaging oil chamber 150 can directly communicate with the oil passage 292 of the output shaft 20o.

As a result, in the automatic transmission 20, it is unnecessary to supply an engaging hydraulic pressure from the complex planetary gear train 25 (from the front portion of the vehicle) to the engaging oil chamber 150 of the first clutch C1 through long oil passages formed in the input shaft 20i and the intermediate shaft 20m, and the engaging hydraulic pressure can be easily supplied from the output shaft 20o (from the rear portion of the vehicle) to the engaging oil chamber 150. In a transmission in which a first carrier of a first planetary gear is selectively connected to an input shaft by a clutch, for example, a member defining an engaging oil chamber in the clutch is disposed in an input shaft (intermediate shaft), and thus, an oil passage formed in an output shaft needs to communicate with an oil passage in the input shaft (intermediate shaft) in order to supply an engaging hydraulic pressure from the output shaft to the engaging oil chamber, leading to an increase in the number of sealing members. In such transmission, in a communication portion between the oil passage in the input shaft (intermediate shaft) and the oil passage in the output member, drag loss of hydraulic oil may increase due to a rotation speed difference between the input shaft and the output shaft, and the amount of leakage of hydraulic oil may increase to a degree corresponding to the increase in the number of sealing members. On the other hand, in the automatic transmission 20, since the engaging oil chamber 150 of the first clutch C1 directly communicates with the oil passage 292 of the output shaft 20o, an increase in drag loss of hydraulic oil as described above can be favorably suppressed, and the number of sealing members 170 can be reduced, so that an increase in the amount of leakage of hydraulic oil can be favorably suppressed.

As described above, the automatic transmission 20 can enhance power transmission efficiency, that is, fuel efficiency and acceleration performance of the vehicle, by increasing the spread and also enhance shifting feeling (feeling of acceleration and deceleration before and after shifting) by optimizing the step ratio. In the automatic transmission 20, the torque distributed to the first clutch C1 can be favorably reduced, and thus, the first clutch C1 can be made compact in at least one of the axial direction and the radial direction. Thus, the automatic transmission 20 can enhance both power transmission efficiency and drivability, and an increase in size of the entire apparatus can be suppressed.

In addition, in the automatic transmission 20, the engaging oil chamber 150 of the first clutch C1 is defined by the clutch drum 110 as the oil chamber defining portion rotating together with the output shaft 20o, the piston 120, and the output shaft 20o, and the oil passage 292 for supplying an engaging hydraulic pressure to the engaging oil chamber 150 is formed in the output shaft 20o, so that the engaging oil chamber 150 can directly communicate with the oil passage 292 of the output shaft 20o. In this manner, it is unnecessary to supply an engaging hydraulic pressure from the complex planetary gear train 25 (from the front portion of the vehicle) to the engaging oil chamber 150 of the first clutch C1 through long oil passages formed in the input shaft 20i and the intermediate shaft 20m, and the engaging hydraulic pressure can be easily supplied from the output shaft 20o (from the rear portion of the vehicle) to the engaging oil chamber 150. In the automatic transmission 20, since the engaging oil chamber 150 of the first clutch C1 can directly communicate with the oil passage 292 in the output shaft 20o, an increase in drag loss of hydraulic oil can be favorably suppressed, and the number of sealing members 170 can be reduced, so that an increase in the amount of leakage of hydraulic oil can be favorably suppressed.

Figure 5:
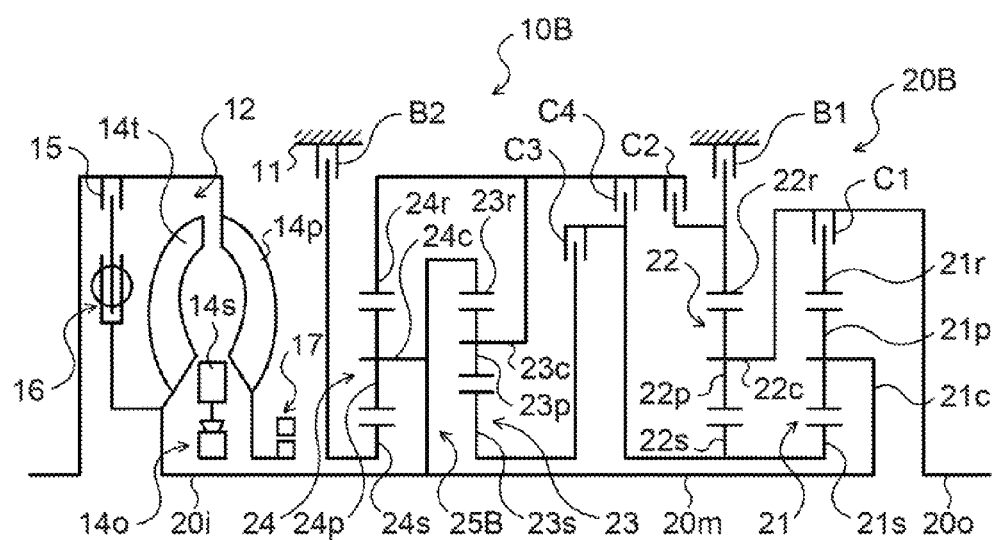
FIG. 5 schematically illustrates a configuration of a power transmission device including a multiple speed transmission according to another embodiment.

FIG. 5 schematically illustrates a configuration of a power transmission device 10B including an automatic transmission 20B as a multiple speed transmission according to another embodiment of a preferred embodiment. The automatic transmission 20B of the power transmission device 10B illustrated in FIG. 5 corresponds to the automatic transmission 20 in which the Simpson type complex planetary gear train 25 is replaced by a so-called CR-CR type complex planetary gear train 25B including the third planetary gear 23 of a single pinion type and the fourth planetary gear 24 of a single pinion type. The automatic transmission 20B employing the CR-CR type complex planetary gear train 25B as described above can enhance power transmission efficiency by reducing gear loss between rotation elements of the complex planetary gear train 25B and enhance ease of assembly while an increase in the weight of the entire apparatus is suppressed by reducing the number of components.

Figure 6:
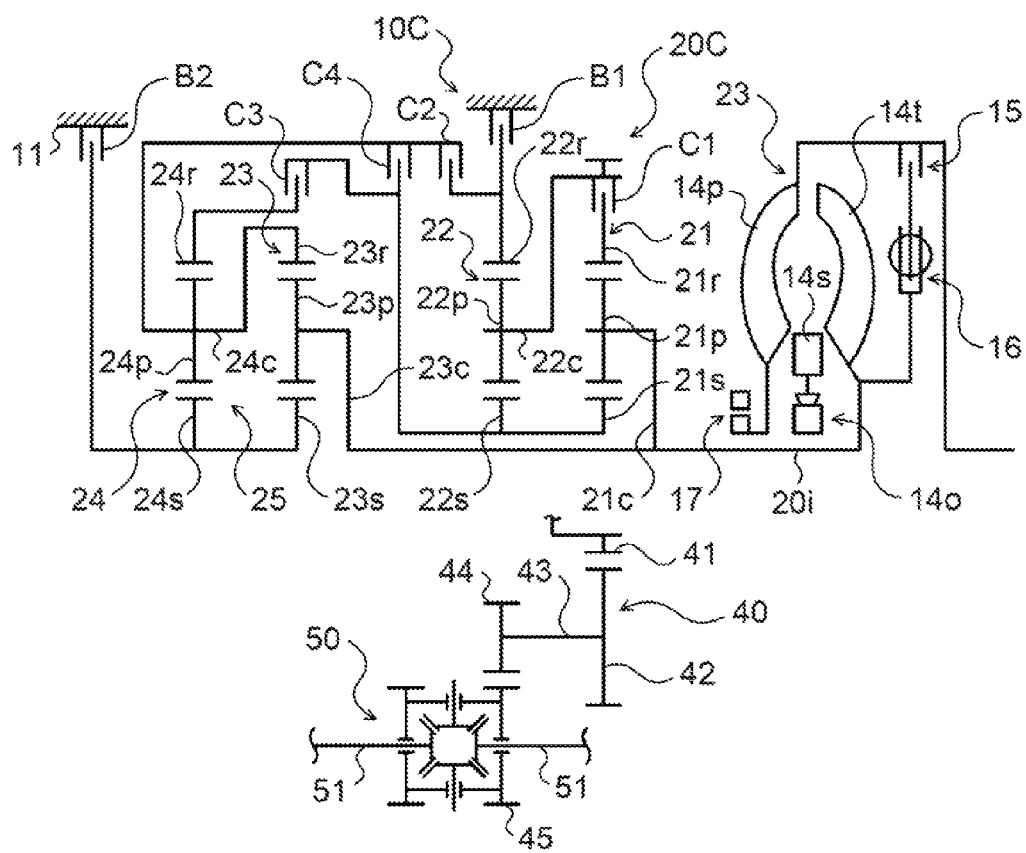
FIG. 6 schematically illustrates a configuration of a power transmission device including a multiple speed transmission according to still another embodiment.

As illustrated in FIG. 5, in the automatic transmission 20B, a fourth sun gear 24s of a fourth planetary gear 24 functions as a fixable element of the complex planetary gear train 25B corresponding to a seventh rotation element (second fixable element) of the automatic transmission 20B. As illustrated in FIG. 6, a third ring gear 23r of the third planetary gear 23 and a fourth carrier 24c of the fourth planetary gear 24 are integrally coupled (constantly coupled) to each other, and coupled (fixed) to an input shaft 20i. Thus, while power is transmitted from an engine to the input shaft 20i, power from the engine is constantly transmitted to the third ring gear 23r and the fourth carrier 24c that are constantly coupled to each other through the input shaft 20i. Accordingly, the third ring gear 23r and the fourth carrier 24c function as an input element of the complex planetary gear train 25B corresponding to an eighth rotation element (second input element) of the automatic transmission 20B. In addition, as illustrated in FIG. 6, a third carrier 23c of the third planetary gear 23 and a fourth ring gear 24r of the fourth planetary gear 24 are integrally coupled (constantly coupled) to each other, and constantly (and coaxially) rotate or stop together. The third carrier 23c and the fourth ring gear 24r that are thus constantly coupled function as a first output element of the complex planetary gear train 25B corresponding to a ninth rotation element (third output element) of the automatic transmission 20B. A third sun gear 23s of the third planetary gear 23 functions as a second output element of the complex planetary gear train 25B corresponding to a tenth rotation element (fourth output element) of the automatic transmission 20B.

Figure 7:
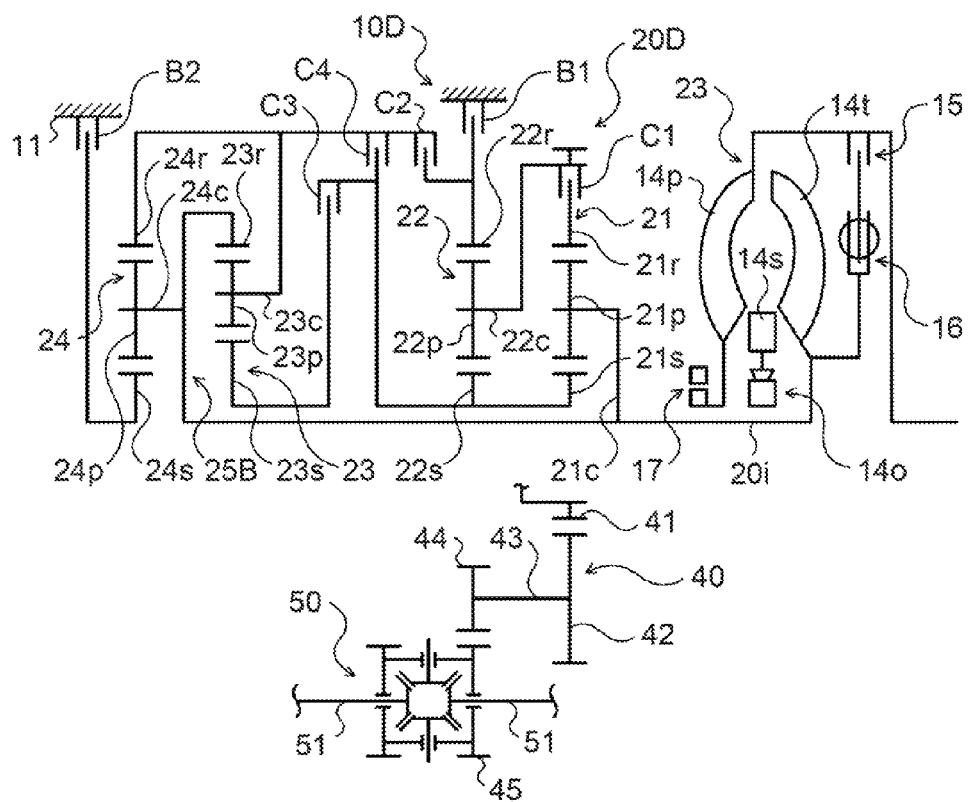
FIG. 7 schematically illustrates a power transmission device including a multiple speed transmission according to another embodiment.

FIG. 6 schematically illustrates a configuration of a power transmission device 10C including an automatic transmission 20C as a multiple speed transmission according to still another embodiment. The power transmission device 10C illustrated in FIG. 6 is connected to a crankshaft of an engine (internal combustion engine) (not shown) transversely mounted in a front portion of a front-wheel-drive vehicle and can transmit power (torque) from the engine to left and right front wheels (drive wheels) (not shown). The automatic transmission 20C of the power transmission device 10C corresponds to the automatic transmission 20 modified for a front-wheel-drive vehicle. FIG. 7 illustrates a power transmission device 10D including an automatic transmission 20D as a multiple speed transmission according to yet another embodiment. The power transmission device 10D illustrated in FIG. 7 is also connected to a crankshaft of an engine (internal combustion engine) (not shown) transversely mounted in a front portion of a front-wheel-drive vehicle and can transmit power (torque) from the engine to left and right front wheels (drive wheels) (not shown). The automatic transmission 20D of the power transmission device 10D corresponds to the automatic transmission 20B modified for a front-wheel-drive vehicle.

In each of the automatic transmissions 20C and 20D, a second carrier 22c of a second planetary gear 22 is constantly coupled to a counter drive gear 41 as an output member, and a first clutch C1 selectively connects a first ring gear 21r as an output element of a first planetary gear 21 to a counter drive gear 41 (second carrier 22c of the second planetary gear 22) as an output member. Power (torque) transmitted from the automatic transmission 20C or 20D to the counter drive gear 41 as the output member is transmitted to the left and right front wheels through the counter drive gear 41, a counter driven gear 42 meshing with the counter drive gear 41, a drive pinion gear (final drive gear) 44 coupled to the counter driven gear 42 through a counter shaft 43, a gear train 40 including a differential ring gear (final driven gear) 45 meshing with the drive pinion gear 44, a differential gear 50 coupled to the differential ring gear 45, and a drive shaft 51. In this manner, the multiple speed transmission according to a preferred embodiment may be configured as a transmission to be installed in a front-wheel-drive vehicle.

Figure 8:
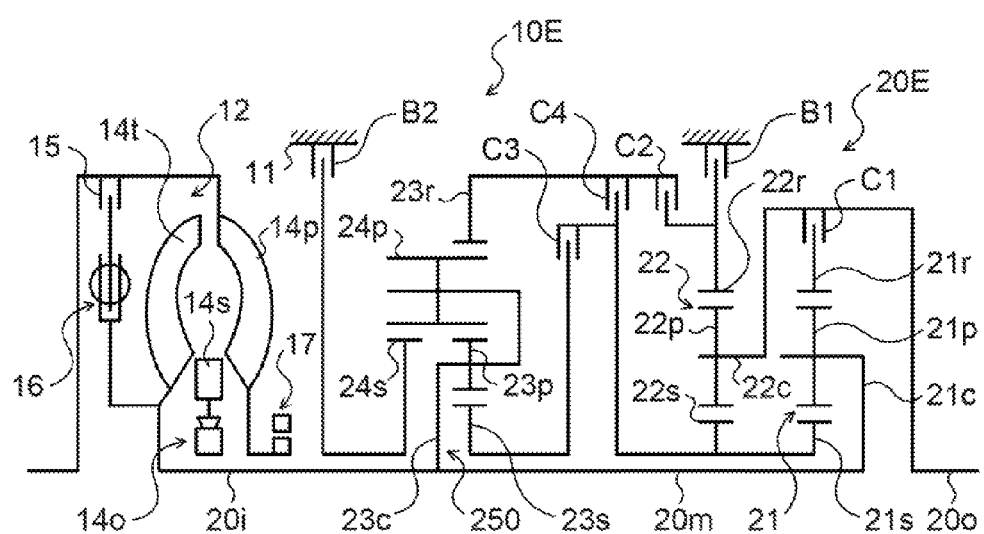
FIG. 8 schematically illustrates a configuration of a power transmission device including a multiple speed transmission according to still another embodiment.

FIG. 8 schematically illustrates a configuration of a power transmission device 10E including an automatic transmission 20E as a multiple speed transmission according to still another embodiment. The automatic transmission 20E of the power transmission device 10E illustrated in FIG. 8 corresponds to the automatic transmission 20 in which the Simpson type complex planetary gear train 25 is replaced by a Ravigneaux type planetary gear mechanism 250 as a complex planetary gear train. The Ravigneaux type planetary gear mechanism 250 includes a third sun gear 23s and a fourth sun gear 24s as external gears, a third ring gear 23r as an internal gear concentric with the third and fourth sun gears 23s and 24s, a plurality of third pinion gears (short pinion gears) 23p meshing with the third sun gear 23s, a plurality of fourth pinion gears (long pinion gears) 24p meshing with the fourth sun gear 24s and the third pinion gears 23p and meshing with the ring gear 23r, and a third carrier 23c rotatably (turnably) and revolvably holding the third pinion gears 23p and the fourth pinion gears 24p.

The third sun gear 23s, the third carrier 23c, the third and fourth pinion gears 23p and 24p, and the third ring gear 23r of the Ravigneaux type planetary gear mechanism 250 constitute a planetary gear of a double pinion type corresponding to the third planetary gear 23 in the complex planetary gear train 25 or 25B. The fourth sun gear 24s, the third carrier 23c, the fourth pinion gears 24p, and the third ring gear 23r of the Ravigneaux type planetary gear mechanism 250 constitute a planetary gear of a single pinion type corresponding to the fourth planetary gear 24 in the complex planetary gear train 25 or 25B. The Ravigneaux type planetary gear mechanism 250 is structured such that a gear ratio λ3 (the number of teeth of the third sun gear 23s/the number of teeth of the third ring gear 23r) of the double pinion type planetary gear as the third planetary gear is λ3=0.464, and a gear ratio λ4 (the number of teeth of the fourth sun gear 24s/the number of teeth of the third ring gear 23r) of the single pinion type planetary gear as the fourth planetary gear is λ4=0.453.

Figure 9:
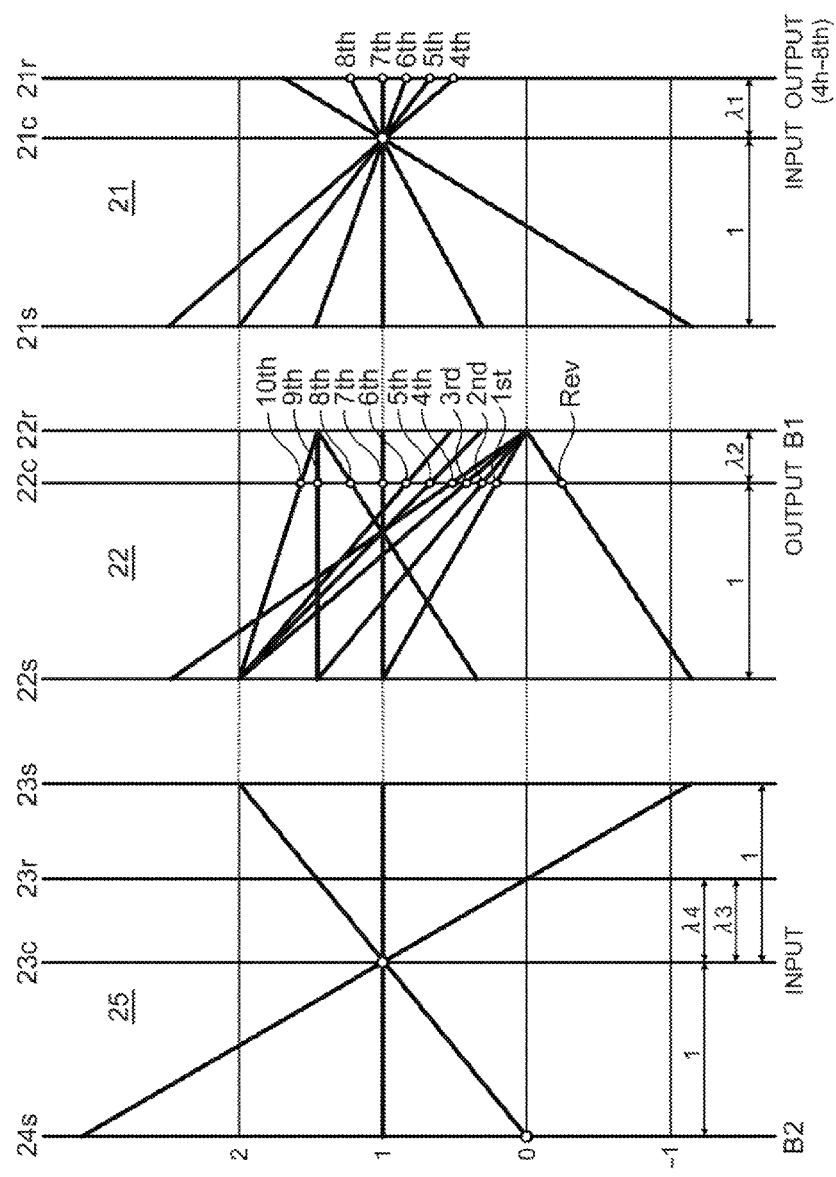
FIG. 9 shows velocity diagrams showing rotation speed ratios of rotation elements to an input rotation speed in the multiple speed transmission illustrated in FIG. 8.

FIG. 9 shows velocity diagrams showing rotation speed ratios of rotation elements to an input rotation speed in the automatic transmission 20E illustrated in FIG. 8. As illustrated in FIGS. 8 and 9, the fourth sun gear 24s of the Ravigneaux type planetary gear mechanism 250 is non-rotatably held stationary (connected) to the transmission case 11 by the second brake B2, and functions as a fixable element of the Ravigneaux type planetary gear mechanism 250 corresponding to a tenth rotation element (second fixable element) of the automatic transmission 20E. The third carrier 23c of the Ravigneaux type planetary gear mechanism 250 is constantly coupled (fixed) to an input shaft 20i. While power is transmitted from an engine to the input shaft 20i, power from the engine is always transmitted to the third carrier 23c through the input shaft 20i. Accordingly, the third carrier 23c functions as an input element of the Ravigneaux type planetary gear mechanism 250 corresponding to an eighth rotation element (second input element) of the automatic transmission 20E. In addition, the third ring gear 23r of the third planetary gear 23 functions as a first output element of the Ravigneaux type planetary gear mechanism 250 corresponding to a ninth rotation element (third output element) of the automatic transmission 20E. The third sun gear 23s of the Ravigneaux type planetary gear mechanism 250 functions as a second output element of the Ravigneaux type planetary gear mechanism 250 corresponding to a tenth rotation element (fourth output element) of the automatic transmission 20E.

Figure 10:
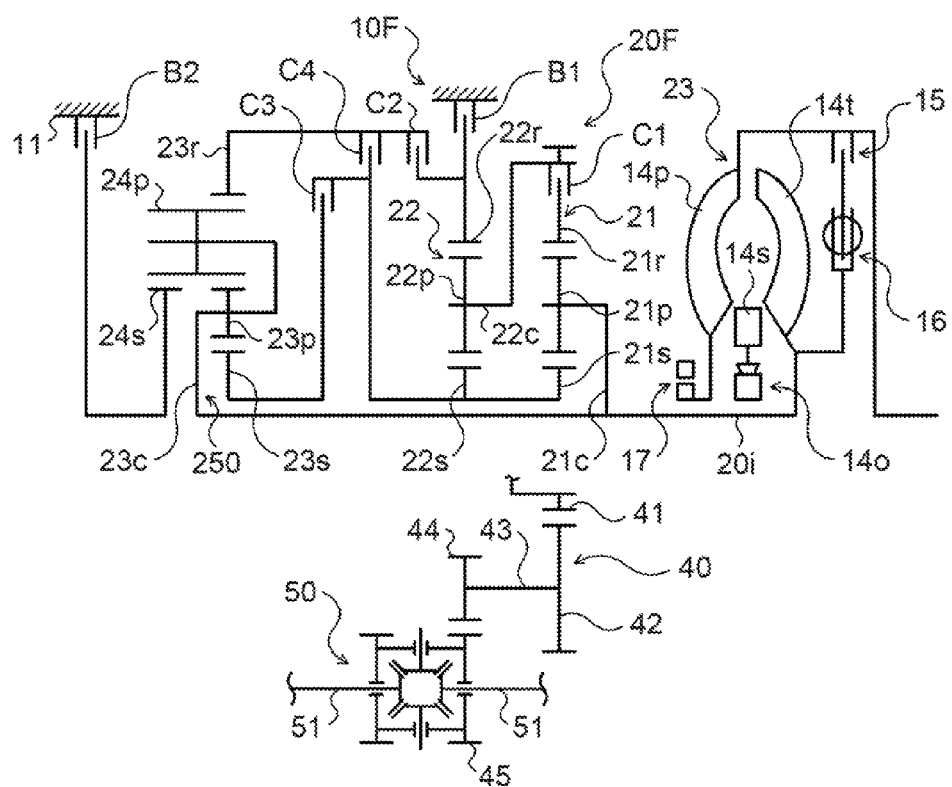
FIG. 10 schematically illustrates a configuration of a power transmission device including a multiple speed transmission according to another embodiment.

The automatic transmission 20E employing the Ravigneaux type planetary gear mechanism 250 as a complex planetary gear train configured by combining the double pinion type planetary gear (third planetary gear) and the single pinion type planetary gear (fourth planetary gear) as described above can enhance ease of assembly while an increase in the weight of the entire apparatus is suppressed by reducing the number of components. The automatic transmission 20E including the Ravigneaux type planetary gear mechanism 250 as a complex planetary gear train may be modified so as to be installed in a front-wheel-drive vehicle. FIG. 10 illustrates a power transmission device 10F including an automatic transmission 20F modified to be installed in a front-wheel-drive vehicle.

In addition, in the automatic transmission 20E, when the fourth sun gear 24s as the fixable element is non-rotatably held stationary by the second brake B2, the Ravigneaux type planetary gear mechanism 250 increases the speed of power transmitted to the third carrier 23c as the input element and transmits the power to the third ring gear 23r as the first output element and the third sun gear 23s as the second output element. As shown in FIG. 9, in the automatic transmission 20E, while the output shaft 20o rotates in the vehicle forward direction, the highest rotation speed of the third sun gear 23s as the second output element whose diameter is smaller than the third ring gear 23r as the first output element and whose strength can be easily maintained is higher than that of the third ring gear 23r. Thus, as compared to the automatic transmission 20 in which the large-diameter fourth ring gear 24r serves as the second output element rotating at a higher speed than the first output element, in the automatic transmission 20E, an increase in dimensions (outer diameter, thickness, etc.), that is, an increase in weight, which is caused by obtaining the strength of components such as a clutch hub, a piston, and a cancel plate of the third clutch C3 rotating together with the third sun gear 23s as the second output element, can be suppressed. As a result, the inertia of the third sun gear 23s and members rotating together with the third sun gear 23s during rotation can be favorably reduced, and thus, shifting performance of the automatic transmission 20E can be enhanced.

In the automatic transmission 20E, the third clutch C3 corresponding to the third sun gear 23s that rotates at a high speed connects and disconnects the third sun gear 23s having a small diameter as described above to and from the first sun gear 21s of the first planetary gear 21 and the second sun gear 22s of the second planetary gear 22, the first sun gear 21s and the second sun gear 22s both having small diameters and constantly coupled to each other. Thus, in the automatic transmission 20E, components of the third clutch C3, such as the clutch hub, the piston, the cancel plate of the clutch C3 rotating together with the third sun gear 23s and the clutch drum (at least a part thereof) rotating together with the first and second sun gears 21s and 22s, can be disposed between the Ravigneaux type planetary gear mechanism 250 and the second planetary gear 22 (one of the first and second planetary gears 21 and 22 disposed closer to the Ravigneaux type planetary gear mechanism 250) so as to be proximate to the axial center of the automatic transmission 20E, that is, the input shaft 20i and the intermediate shaft 20m as much as possible. As a result, the automatic transmission 20E can more favorably reduce inertia of the third sun gear 23s rotating at a high speed, members rotating together with the third sun gear 23s, the first and second sun gears 21s and 22s rotating at a higher speed than the third sun gear 23s as illustrated in FIG. 9, and members rotating together with the first and second sun gears 21s and 22s.

In the above-described automatic transmissions 20, 20B, 20C, 20D, 20E, and 20F, at least one of the first through fourth clutches C1 to C4 and the first and second brakes B1 and B2 may be an engaging element such as a dog clutch or a dog brake. For example, the automatic transmissions 20 to 20F may employ a dog brake as a first brake B1 that is constantly engaged in forming the first through fourth forward speeds and engaged in forming the reverse speed. In the automatic transmission 20, for example, the gear ratios λ1 to λ4 of the first through fourth planetary gears 21 to 24 are not limited to those described above. In the automatic transmission 20, for example, at least one of the first and second planetary gears 21 and 22 may be a double pinion type planetary gear, and the complex planetary gear train may be of a type except the Simpson type, the CR-CR type, and the Ravigneaux type.

INDUSTRIAL APPLICABILITY

The present invention is applicable in the industry of manufacturing a multiple speed transmission, for example.

The invention claimed is:

1. A multiple speed transmission for changing a speed of power transmitted to an input member and transmitting the power to an output member, the multiple speed transmission comprising:
a first planetary gear including a first rotation element, a second rotation element, and a third rotation element that are arranged in order with intervals in accordance with a gear ratio on a velocity diagram;
a second planetary gear including a fourth rotation element, a fifth rotation element, and a sixth rotation element that are arranged in order with intervals in accordance with a gear ratio on a velocity diagram;
a complex planetary gear train including a fixable element, an input element constantly coupled to the input member, a first output element, and a second output element that are arranged in order with intervals in accordance with a gear ratio on a velocity diagram; and
six engaging elements each connecting and disconnecting a rotation element of one of the first planetary gear, the second planetary gear, and the complex planetary gear train to and from another rotation element or a stationary member, wherein
the first rotation element of the first planetary gear is constantly coupled to the fourth rotation element of the second planetary gear,
the second rotation element of the first planetary gear is constantly coupled to the input element of the complex planetary gear train,
the fifth rotation element of the second planetary gear is constantly coupled to the output member,
a first engaging element of the six engaging elements connects and disconnects the fifth rotation element of the second planetary gear and the output member that are constantly coupled to each other to and from the third rotation element of the first planetary gear, and
first through tenth forward speeds and a reverse speed are formed by selectively engaging three of the six engaging elements including the first engaging element, wherein a second engaging element of the six engaging elements connects and disconnects the sixth rotation element of the second planetary gear to and from the first output element of the complex planetary gear train, a third engaging element of the six engaging elements connects and disconnects the first rotation element of the first planetary gear and the fourth rotation element of the second planetary gear that are constantly coupled to each other to and from the second output element of the complex planetary gear train, a fourth engaging element of the six engaging elements connects and disconnects the first rotation element of the first planetary gear and the fourth rotation element of the second planetary gear that are constantly coupled to each other to and from the first output element of the complex planetary gear train, a fifth engaging element of the six engaging elements connects and non-rotatably holds the sixth rotation element of the second planetary gear stationary to the stationary member, and disconnects the sixth rotation element of the second planetary gear from the stationary member, and a sixth engaging element of the six engaging elements connects and non-rotatably holds the fixable element of the complex planetary gear train stationary to the stationary member, and disconnects the fixable element of the complex planetary gear train from the stationary member.

2. The multiple speed transmission according to claim 1, wherein the first forward speed is formed by engaging the third engaging element, the fourth engaging element, and the fifth engaging element, the second forward speed is formed by engaging the fourth engaging element, the fifth engaging element, and the sixth engaging element, the third forward speed is formed by engaging the third engaging element, the fifth engaging element, and the sixth engaging element, the fourth forward speed is formed by engaging the first engaging element, the fifth engaging element, and the sixth engaging element, the fifth forward speed is formed by engaging the first engaging element, the third engaging element, and the sixth engaging element, the sixth forward speed is formed by engaging the first engaging element, the fourth engaging element, and the sixth engaging element, the seventh forward speed is formed by engaging the first engaging element, the second engaging element, and the fourth engaging element, the eighth forward speed is formed by engaging the first engaging element, the second engaging element, and the sixth engaging element, the ninth forward speed is formed by engaging the second engaging element, the fourth engaging element, and the sixth engaging element, the tenth forward speed is formed by engaging the second engaging element, the third engaging element, and the sixth engaging element, and the reverse speed is formed by engaging the second engaging element, the third engaging element, and the fifth engaging element.

3. The multiple speed transmission according to claim 1, wherein the first planetary gear is a single pinion type planetary gear including a first sun gear, a first ring gear, and a first carrier rotatably and revolvably holding a plurality of first pinion gears meshing with the first sun gear and the first ring gear, the second planetary gear is a single pinion type planetary gear including a second sun gear, a second ring gear, and a second carrier rotatably and revolvably holding a plurality of second pinion gears meshing with the second sun gear and the second ring gear, and the first rotation element is the first sun gear, the second rotation element is the first carrier, the third rotation element is the first ring gear, the fourth rotation element is the second sun gear, the fifth rotation element is the second carrier, and the sixth rotation element is the second ring gear.

4. The multiple speed transmission according to claim 3, wherein the complex planetary gear train includes a single pinion type third planetary gear including a third sun gear, a third ring gear, and a third carrier rotatably and revolvably holding a plurality of third pinion gears meshing with the third sun gear and the third ring gear, and also includes a single pinion type fourth planetary gear including a fourth sun gear, a fourth ring gear, and a fourth carrier rotatably and revolvably holding a plurality of fourth pinion gears meshing with the fourth sun gear and the fourth ring gear, and the fixable element is the third sun gear and the fourth sun gear that are constantly coupled to each other, the input element is the third carrier, the first output element is the third ring gear and the fourth carrier that are constantly coupled to each other, and the second output element is the fourth ring gear.

5. The multiple speed transmission according to claim 3, wherein the complex planetary gear train includes a single pinion type third planetary gear including a third sun gear, a third ring gear, and a third carrier rotatably and revolvably holding a plurality of third pinion gears meshing with the third sun gear and the third ring gear, and also includes a single pinion type fourth planetary gear including a fourth sun gear, a fourth ring gear, and a fourth carrier rotatably and revolvably holding a plurality of fourth pinion gears meshing with the fourth sun gear and the fourth ring gear, and the fixable element is the fourth sun gear, the input element is the third ring gear and the fourth carrier that are constantly coupled to each other, the first output element is the third carrier and the fourth ring gear that are constantly coupled to each other, and the second output element is the third sun gear.

6. The multiple speed transmission according to claim 3, wherein the complex planetary gear train is a Ravigneaux type planetary gear including a third sun gear, a fourth sun gear, a third pinion gear meshing with the third sun gear, a fourth pinion gear meshing with the fourth sun gear and meshing with the third pinion gear, a third carrier rotatably and revolvably holding the third and fourth pinion gears, and a third ring gear meshing with the fourth pinion gear, and the fixable element is the fourth sun gear, the input element is the fourth carrier, the first output element is the third ring gear, and the second output element is the third sun gear.

7. The multiple speed transmission according to claim 3, wherein the complex planetary gear train transfers the power, which has been transferred to the input element, to the first and second output elements with the speed of the power increased such that a rotational speed of the second output element is higher than a rotational speed of the first output element when the fixable element is held stationary by the first brake so as to be unrotatable;

the tenth forward speed is formed by engaging the second engaging element, the third engaging element and the sixth engaging element, and disengaging the first engaging element, the fourth engaging element and the fifth engaging element, when the tenth forward speed is formed, the first output element connects to the second ring gear by the engaged second engaging element and the second output element connects to the first and the second sun gears by the engaged third engaging element, thereby the second carrier and the output member rotate at a rotational speed between the rotational speed of the first output element and the rotational speed of the second output element, and a rotational speed of the first ring gear rotates at lower than a rotational speed of the input member and the output member outputs through an outer side of the first ring gear.

8. The multiple speed transmission according to claim 1, wherein
the output member is an output shaft coupled to a rear wheel of a vehicle through a differential gear.

9. The multiple speed transmission according to claim 8, wherein
the first engaging element includes a piston and an engaging oil chamber defined by at least the piston and the output member,
the output member includes an output member oil passage for supplying an engaging hydraulic pressure to the engaging oil chamber,
the engaging oil chamber directly communicates with the output member oil passage of the output member,
the output member oil passage communicates with an in-case oil passage formed in a case of the multiple speed transmission, and
a pair of sealing members is interposed between the case and the output shaft so as to sandwich a communication portion between the output member oil passage and the in-case oil passage in the front-rear direction.

10. The multiple speed transmission according to claim 9, wherein
the complex planetary gear train is disposed close to a motor of the vehicle, the first planetary gear is disposed close to the output member, and the second planetary gear is disposed between the complex planetary gear train and the first planetary gear.

11. The multiple speed transmission according to claim 1, wherein
the output member is a counter drive gear included in a gear train that transmits power to a differential gear coupled to a front wheel of a vehicle.

12. The multiple speed transmission according to claim 1, wherein
the complex planetary gear train includes a single pinion type third planetary gear including a third sun gear, a third ring gear, and a third carrier rotatably and revolvably holding a plurality of third pinion gears meshing with the third sun gear and the third ring gear, and also includes a single pinion type fourth planetary gear including a fourth sun gear, a fourth ring gear, and a fourth carrier rotatably and revolvably holding a plurality of fourth pinion gears meshing with the fourth sun gear and the fourth ring gear, and the fixable element is the third sun gear and the fourth sun gear that are constantly coupled to each other, the input element is the third carrier, the first output element is the third ring gear and the fourth carrier that are constantly coupled to each other, and the second output element is the fourth ring gear.

13. The multiple speed transmission according to claim 1, wherein
the complex planetary gear train includes a single pinion type third planetary gear including a third sun gear, a third ring gear, and a third carrier rotatably and revolvably holding a plurality of third pinion gears meshing with the third sun gear and the third ring gear, and also includes a single pinion type fourth planetary gear including a fourth sun gear, a fourth ring gear, and a fourth carrier rotatably and revolvably holding a plurality of fourth pinion gears meshing with the fourth sun gear and the fourth ring gear, and the fixable element is the fourth sun gear, the input element is the third ring gear and the fourth carrier that are constantly coupled to each other, the first output element is the third carrier and the fourth ring gear that are constantly coupled to each other, and the second output element is the third sun gear.

14. The multiple speed transmission according to claim 1, wherein
the complex planetary gear train is a Ravigneaux type planetary gear including a third sun gear, a fourth sun gear, a third pinion gear meshing with the third sun gear, a fourth pinion gear meshing with the fourth sun gear and meshing with the third pinion gear, a third carrier rotatably and revolvably holding the third and fourth pinion gears, and a third ring gear meshing with the fourth pinion gear, and the fixable element is the fourth sun gear, the input element is the fourth carrier, the first output element is the third ring gear, and the second output element is the third sun gear.

15. The multiple speed transmission according to claim 1, wherein
the complex planetary gear train increases the speed of the power transmitted to the input element and outputs the increased speed from the first and the second output elements when the fixable element is non-rotatably held stationary by the six engaging elements.

16. The multiple speed transmission according to claim 15, wherein
the first and second output elements of the complex planetary gear mechanism rotate in the same direction as the rotational direction of the input member.

17. The multiple speed transmission according to claim 1, wherein
the tenth forward speed is formed by engaging the second engaging element, the third engaging element and the sixth engaging element, and disengaging the first engaging element, the fourth engaging element and the fifth engaging element and the output members rotates at a higher speed than the speed of the input member.

18. The multiple speed transmission according to claim 17, wherein
the first planetary gear is a single pinion type planetary gear including a first sun gear, a first ring gear, and a first carrier rotatably and revolvably holding a plurality of first pinion gears meshing with the first sun gear and the first ring gear, the first rotation element is the first sun gear,
the second rotation element is the first carrier and
the third rotation element is the first ring gear.

19. The multiple speed transmission according to claim 1, wherein
the first engaging element includes:
a plurality of frictional engaging plates,
a piston pressing the plurality of frictional engaging plates and
an engaging oil chamber defined by at least the piston and the output member so as to move the piston.

20. The multiple speed transmission according to claim 1, wherein
the first engaging element includes:
a plurality of frictional engaging plates,
a piston pressing the plurality of frictional engaging plates and
an engaging oil chamber moving the piston in an axial direction of the transmission, wherein the engaging oil chamber is disposed such that the first planetary gear is between the engaging oil chamber and the second planetary gear in the axial direction of the transmission.

21. A multiple speed transmission for changing a speed of power transmitted to an input member and transmitting the power to an output member, the multiple speed transmission comprising:
a first planetary gear including a first rotation element, a second rotation element, and a third rotation element that are arranged in order with intervals in accordance with a gear ratio on a velocity diagram;
a second planetary gear including a fourth rotation element, a fifth rotation element, and a sixth rotation element that are arranged in order with intervals in accordance with a gear ratio on a velocity diagram;
a complex planetary gear train including a fixable element, an input element constantly coupled to the input member, a first output element, and a second output element that are arranged in order with intervals in accordance with a gear ratio on a velocity diagram; and
six engaging elements each connecting and disconnecting a rotation element of one of the first planetary gear, the second planetary gear, and the complex planetary gear train to and from another rotation element or a stationary member, wherein
the first rotation element of the first planetary gear is constantly coupled to the fourth rotation element of the second planetary gear,
the second rotation element of the first planetary gear is constantly coupled to the input element of the complex planetary gear train,
the fifth rotation element of the second planetary gear is constantly coupled to the output member,
a first engaging element of the six engaging elements connects and disconnects the fifth rotation element of the second planetary gear and the output member that are constantly coupled to each other to and from the third rotation element of the first planetary gear, and
first through tenth forward speeds and a reverse speed are formed by selectively engaging three of the six engaging elements including the first engaging element, wherein
the first planetary gear is a single pinion type planetary gear including a first sun gear, a first ring gear, and a first carrier rotatably and revolvably holding a plurality of first pinion gears meshing with the first sun gear and the first ring gear,
the second planetary gear is a single pinion type planetary gear including a second sun gear, a second ring gear, and a second carrier rotatably and revolvably holding a plurality of second pinion gears meshing with the second sun gear and the second ring gear, and
the first rotation element is the first sun gear, the second rotation element is the first carrier, the third rotation element is the first ring gear, the fourth rotation element is the second sun gear, the fifth rotation element is the second carrier, and the sixth rotation element is the second ring gear.

22. The multiple speed transmission according to claim 21, wherein
the complex planetary gear train includes a single pinion type third planetary gear including a third sun gear, a third ring gear, and a third carrier rotatably and revolvably holding a plurality of third pinion gears meshing with the third sun gear and the third ring gear, and also includes a single pinion type fourth planetary gear including a fourth sun gear, a fourth ring gear, and a fourth carrier rotatably and revolvably holding a plurality of fourth pinion gears meshing with the fourth sun gear and the fourth ring gear, and
the fixable element is the third sun gear and the fourth sun gear that are constantly coupled to each other, the input element is the third carrier, the first output element is the third ring gear and the fourth carrier that are constantly coupled to each other, and the second output element is the fourth ring gear.

23. The multiple speed transmission according to claim 21, wherein
the complex planetary gear train includes a single pinion type third planetary gear including a third sun gear, a third ring gear, and a third carrier rotatably and revolvably holding a plurality of third pinion gears meshing with the third sun gear and the third ring gear, and also includes a single pinion type fourth planetary gear including a fourth sun gear, a fourth ring gear, and a fourth carrier rotatably and revolvably holding a plurality of fourth pinion gears meshing with the fourth sun gear and the fourth ring gear, and
the fixable element is the fourth sun gear, the input element is the third ring gear and the fourth carrier that are constantly coupled to each other, the first output element is the third carrier and the fourth ring gear that are constantly coupled to each other, and the second output element is the third sun gear.

24. The multiple speed transmission according to claim 21, wherein
the complex planetary gear train is a Ravigneaux type planetary gear including a third sun gear, a fourth sun gear, a third pinion gear meshing with the third sun gear, a fourth pinion gear meshing with the fourth sun gear and meshing with the third pinion gear, a third carrier rotatably and revolvably holding the third and fourth pinion gears, and a third ring gear meshing with the fourth pinion gear, and
the fixable element is the fourth sun gear, the input element is the fourth carrier, the first output element is the third ring gear, and the second output element is the third sun gear.

* * * * *